(12) United States Patent
Phelan et al.

(10) Patent No.: US 7,279,505 B2
(45) Date of Patent: Oct. 9, 2007

(54) RADIATION-CURABLE PREPOLYMERS

(75) Inventors: John Christopher Phelan, Gurnee, IL (US); Michael Hugh Quinn, Valpraiso, IN (US); Joshua Andrew Wallach, Des Plaines, IL (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 11/243,928

(22) Filed: Oct. 5, 2005

(65) Prior Publication Data

US 2006/0030679 A1   Feb. 9, 2006

Related U.S. Application Data

(62) Division of application No. 10/640,294, filed on Aug. 13, 2003, now Pat. No. 6,995,192.

(60) Provisional application No. 60/403,333, filed on Aug. 14, 2002.

(51) Int. Cl.
*C08F 2/26* (2006.01)

(52) U.S. Cl. ............... 522/90; 522/97; 522/96; 522/173; 522/175; 522/174; 528/44; 528/48; 528/49; 528/52; 528/53; 528/59; 528/367; 528/368; 528/396; 528/480; 528/494; 528/491; 528/486; 523/106; 526/303.1; 526/305; 526/307.2; 526/307.4; 526/310; 526/333; 526/332; 526/319; 526/318; 526/317.1; 526/312; 526/311; 264/1.7

(58) Field of Classification Search ............... 522/90, 522/97, 96, 173, 174, 175; 528/44, 48, 49, 528/52, 53, 59, 367, 368, 396, 480, 494, 528/491, 486; 523/106; 526/303.1, 304, 526/307.1, 310, 307.4, 333, 332, 319, 318, 526/317.1, 312, 311; 424/422, 427, 429; 264/1.7, 2.2, 2.3, 2.4, 2.6

See application file for complete search history.

(56) References Cited

U.S. PATENT DOCUMENTS

| | | | | |
|---|---|---|---|---|
| 4,065,587 A | * | 12/1977 | Ting | 427/518 |
| 5,489,841 A | * | 2/1996 | Henkelmann | 324/115 |
| 5,508,317 A | * | 4/1996 | Muller | 522/85 |
| 5,583,163 A | * | 12/1996 | Muller | 522/152 |
| 5,665,840 A | * | 9/1997 | Pohlmann et al. | 526/264 |
| 5,789,464 A | * | 8/1998 | Muller | 523/108 |
| 5,807,927 A | * | 9/1998 | Stockinger et al. | 525/58 |
| 5,849,810 A | * | 12/1998 | Muller | 522/85 |
| 5,872,675 A | * | 2/1999 | Solhjell | 360/77.01 |
| 5,932,674 A | * | 8/1999 | Muller | 526/266 |
| 5,936,052 A | * | 8/1999 | Bothe et al. | 526/264 |
| 5,939,489 A | * | 8/1999 | Muller | 525/61 |
| 6,011,077 A | * | 1/2000 | Muller | 522/35 |
| 6,106,746 A | * | 8/2000 | Muller | 264/1.36 |
| 6,149,692 A | * | 11/2000 | Lally et al. | 8/444 |
| 6,149,842 A | * | 11/2000 | Lally et al. | 264/1.36 |
| 6,156,244 A | * | 12/2000 | Muller et al. | 264/2.6 |
| 6,162,844 A | * | 12/2000 | Lally et al. | 523/106 |
| 6,165,408 A | * | 12/2000 | Steinmann | 264/496 |
| 6,190,603 B1 | * | 2/2001 | Steinmann et al. | 264/496 |
| 6,265,509 B1 | * | 7/2001 | Muller | 526/266 |
| 6,303,687 B1 | * | 10/2001 | Muller | 525/61 |
| 6,342,570 B1 | * | 1/2002 | Bothe et al. | 526/264 |

* cited by examiner

*Primary Examiner*—Sanza L McClendon
(74) *Attorney, Agent, or Firm*—Sheng-Hsin Hu; Jian Zhou

(57) ABSTRACT

The present invention provides a radiation-curable prepolymer. The radiation-curable prepolymer of the invention is prepared by reacting an isocyanate-capped polyurethane with an ethylenically unsaturated amine or an ethylenically unsaturated monohydroxy compound or a mixture thereof, wherein the isocyanate-capped polyurethane is a copolymerization production of: (a) at least one polyalkylene glycol; (b) at least one branching agent having at least three hydroxy groups; and (c) at least one di- or polyisocyanate. The radiation-curable prepolymer of the invention can find use in economically producing contact lenses which have durable, highly elastic soft contact lenses with desired physical properties. In addition, the present invention provides method for making a radiation-curable prepolymer of the invention and for making a medical device, preferably an ophthalmic device, more preferably a contact lens.

5 Claims, No Drawings

RADIATION-CURABLE PREPOLYMERS

This application is a division of U.S. patent application Ser. No. 10/640,294, filed Aug. 13 2003, U.S. Pat. No. 6,995,192, which claims benefit under 35 U.S.C. § 119 (e) of U.S. provisional application Ser. No. 60/403,333 filed Aug. 14, 2002, incorporated by reference in its entirety.

The present invention is related to radiation-curable prepolymers useful for making polymeric articles, preferably ophthalmic device, more preferably soft contact lenses. In particular, the present invention is related to water-soluble radiation-curable prepolymers. In addition, the present invention is related to methods for preparing radiation-curable prepolymers of the invention as well as methods for making a polymeric article, preferably ophthalmic devices, more preferably soft contact lenses from radiation-curable prepolymers of the invention.

BACKGROUND

It is well known that contact lenses can be used for cosmetics and the correction of visual acuity. The ideal contact lens is one which is not only comfortable to wear for extended periods of time, but also easily and reproducibly manufactured at minimum cost in time and labor.

Contact lenses can be manufactured economically in large numbers by the so-called mold or full-mold process. Known contact lens-molding processes are described in, for example, PCT patent application no. WO/87/04390 or in EP-A 0 367 513. In a typical molding process, a predetermined amount of a polymerizable or crosslinkable material is placed in the female mold half and the mold is closed by placing the male mold half proximately to the female mold half to create a cavity having a desired geometry for a contact lens. Normally, a surplus of polymerizable or crosslinkable material is used so that when the male and female halves of the mold are closed, the excess amount of the material is expelled out into an overflow area adjacent to the mold cavity. The polymerizable or crosslinkable material remaining within the mold is polymerized or cross-linked with the delivery of radiation thereto through UV light, heat action, or another non-thermal methods. Since the geometry of the ophthalmic lens is specifically defined by the cavity between the male and female mold halves and since the geometry of the edge of the ophthalmic lens is defined by the contour of the two mold halves in the area where they make contact, a contact lens is manufactured into a final form between typically male and female mold halves, with no additional finishing work on the surface of the lens or the edges of the lens. Such full-mold process can reduce cost in the production of contact lenses. However, In a typical molding process, a contact lens, which is removed from the mold after curing, needs to undergo the other manufacturing processes such as hydration/extraction and sterilization. Therefore, there is still room for further reducing manufacturing cost of contact lenses.

U.S. Pat. Nos. 5,508,317, 5,583,463, 5,789,464, and 5,849,810 describe an improved manufacturing process for economically producing contact lenses in large numbers. By using a water-soluble composition of a prepolymer which is a water-soluble photo-crosslinkable polyvinyl alcohol, a finished lens of optical quality can be produced in a mold within a few seconds without the necessity for subsequent extraction or finishing steps to the contact lens. With such manufacturing process, contact lenses can be manufactured at considerably low cost and thus it is possible to produce disposable contact lenses that are discarded by the user after a single use.

Contact lenses manufactured by the process of the U.S. Pat. No. 5,583,163 have advantageous properties such as a good compatibility with the human cornea resulting in a high wearing comfort and the absence of irritation and allergenic effects. However, despite the good mechanical stability of the underlying polyvinyl alcohol material problems may sometimes show up in production. In particular, during mold opening and removing the contact lenses from the mold, cracks, flaws or tears may occur in the lenses or in the worst case the contact lenses even break totally. Contact lenses having such defects have to be discarded and lower the overall production yield.

In addition, contact lenses made from a water-soluble photo-crosslinkable polyvinyl alcohol prepolymer do not always posses all of most desirable physical properties, for example, such as elasticity and durability, for the intended uses.

Accordingly, there is still a need for a new prepolymer for economically producing durable, highly elastic soft contact lenses with desired physical properties.

SUMMARY OF THE INVENTION

In accomplishing the foregoing, there is provided, in accordance with one aspect of the present invention, a radiation-curable prepolymer, prepared by reacting an isocyanate-capped polyurethane with an ethylenically unsaturated amine or an ethylenically unsaturated monohydroxy compound or a mixture thereof, wherein the isocyanate-capped polyurethane is a copolymerization production of: (a) at least one polyalkylene glycol; (b) at least one branching agent having at least three hydroxy groups; and (c) at least one di- or polyisocyanate.

In another aspect, the present invention provides a solventless method for preparing a radiation-curable prepolymer of the invention. The solventless method comprises: (I) preparing a melted reaction mixture comprising (a) one or more polyalkylene glycols, (b) one or more branching agents each having at least three hydroxy group, and (c) at least one di- or polyisocyanate, wherein the stoichiometry of components (a), (b) and (c) in the melted reaction mixture is chosen so that the number of NCO equivalents of component (c) is greater than the sum of OH equivalents of components (a) and (b); (II) reacting components (a) and (b) with component (c) in the melted reaction mixture at a desired temperature to form an isocyanate-capping polyurethane; and (III) reacting the formed isocyanate-capping polyurethane, without intermediate isolation, with an ethylenically unsaturated amine (primary or secondary amine) or an ethylenically unsaturated monohydroxy compound or a mixture thereof, to prepare the radiation-curable prepolymer of the invention.

In also another aspect, the present invention provides a polymer which is a product of radiation-crosslinking of an above-described radiation-curable prepolymer of the invention in the presence or preferably in the absence of one or more additional vinylic comonomers.

In a further aspect, the present invention provides a medical device, preferably an ophthalmic device, more preferably a contact lens, which is obtained by crosslinking an above-described radiation-curable prepolymer of the invention in the presence or preferably in the absence of one or more additional vinylic comonomers.

In another further aspect, the present invention provides a method for producing an ophthalmic device, the method comprising the steps of: a) introducing an above-described radiation-curable prepolymer of the invention, which is liquid or readily meltable at room temperature, and which is essentially free from solvents, into a mold, in the presence or preferably in the absence of one or more additional vinylic comonomers, and optionally in the presence of a photo-initiator, b) crosslinking by actinic radiation the radiation-curable prepolymer, and c) opening the mold so that the article can be removed from the mold.

In a still further aspect, the present invention provides a method for producing an ophthalmic device, the method comprising the steps of: a) introducing an aqueous solution of an above-described radiation-curable prepolymer of the invention, in the presence or preferably in the absence of one or more additional vinylic comonomers, and optionally in the presence of a photo-initiator, into a mold; b) crosslinking by actinic radiation the radiation-curable prepolymer, and c) opening the mold so that the article can be removed from the mold.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE PREFERRED EMBODIMENTS

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

In one aspect, the present invention relates to a radiation-curable prepolymer, which is obtained by introducing ethylenically unsaturated groups into an isocyanate-capped polyurethane.

A "radiation-curable prepolymer" refers to a starting polymer which can be crosslinked upon actinic radiation to obtain a crosslinked polymer having a molecular weight much higher than the starting polymer. Examples of actinic radiation are UV irradiation, ionized radiation (e.g. gamma ray or X-ray irradiation), microwave irradiation, and the like.

An isocyanate-capped polyurethane of the invention is a copolymerization product of
(a) at least one polyalkylene glycol of formula $$HO-(R_1-O)_n-(R_2-O)_m-(R_3-O)_p-H \qquad (1)$$

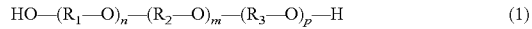

wherein $R_1$, $R_2$, and $R_3$, independently of one other, are each linear or branched $C_2$-$C_4$-alkylene, and n, m and p, independently of one another, are each a number from 0 to 100, wherein the sum of (n+m+p) is 5 to 100, (b) at least one branching agent selected from the group consisting of
  (i) a linear or branched aliphatic polyhydroxy compound of formula $$R_4-(OH)_x \qquad (2),$$

wherein $R_4$ is a linear or branched $C_3$-$C_{18}$ aliphatic multi-valent radical and x is a number $\geq 3$,
  (ii) a polyether polyol, which is the polymerization product of a compound of formula (2) and a glycol,
  (iii) a polyester polyol, which is the polymerization product of a compound of formula (2), a dicarboxylic acid or a derivative thereof and a diol, and
  (iv) a cycloaliphatic polyol selected from the group consisting of a $C_5$-$C_8$-cycloalkane which is substituted by $\geq 3$ hydroxy groups and which is unsubstituted by alkyl radical, a $C_5$-$C_8$-cycloalkane which is substituted by $\geq 3$ hydroxy groups and which is substituted by one ore more $C_1$-$C_4$ alkyl radicals, and an unsubstituted mono- and disaccharide,
  (v) an aralkyl polyol having at least three hydroxy $C_1$-$C_4$ alkyl radicals, and (c) at least one di- or polyisocyanate of formula $$R_5-(NCO)_y \qquad (3)$$

wherein $R_5$ a linear or branched aliphatic polyisocyanate with 3 to 24 C-atoms, the radical of a cycloaliphatic or aliphatic-cycloaliphatic polyisocyanate with 3 to 24 C-atoms, or the radical of an aromatic or aralkyl polyisocyanate with 6 to 24 C-atoms, and y is a number from 2 to 6.

In formula (1), n, m and p, independently of one another, preferably each denote a number from 0 to 50, whereby the sum of (n+m+p) is 8 to 50. Most preferably, p, m and p, independently of one another, each denote a number from 0 to 25, whereby the sum of (n+m+p) is 9 to 25. In formula (1'), q preferably signifies a number from 1 to 20.

In formula (1), where p is zero, n and m, independently of one another, are each a number from 0 to 100, preferably 0 to 50, and most preferably 0 to 25, and the sum of (n+m) is 5 to 100, preferably 8 to 50, most preferably 9 to 25.

In formula (1), where p and m are each 0, n is a number from 5 to 100, preferably 8 to 50, most preferably 9 to 25.

Exemplary poly(alkylene glycol)s include, but are not limited to a poly(ethylene glycol), a poly(propylene glycol), a poly(ethylene glycol)/poly(propylene glycol) block polymer, a poly(ethylene glycol)/poly(propylene glycol)/poly(butylene glycol) block polymer, a polytetrahydrofuran, a poloxamer, and a mixture thereof.

Poloxamers are hydroxy terminated tri-block copolymers with the structure PEG-PPG-PEG (where "PEG" is poly (ethylene glycol) and "PPG" is poly(propylene glycol)) and are available, for example, under the tradename PLU-RONIC®. The order of PEG and PPG blocks can be reversed creating block copolymers with the structure PPG-PEG-PPG, which are available, for example, under the tradename PLURONIC-R®. A considerable number of poloxamers is known, differing merely in the molecular weight and in the PEG/PPG ratio. Examples are poloxamer 101, 105, 108, 122, 123, 124, 181, 182, 183, 184, 185, 188, 212, 215, 217, 231, 234, 235, 237, 238, 282, 284, 288, 331, 333, 334, 335, 338, 401, 402, 403 and 407. Poloxamer 101 has a PEG/PPG weight ratio of about 10/90 and poloxamer 108 having a PEG/PPG weight ratio of about 80/20.

Polyoxypropylene-polyoxyethylene block copolymers can also be designed with hydrophilic blocks comprising a random mix of ethylene oxide and propylene oxide repeating units. To maintain the hydrophilic character of the block, ethylene oxide will predominate. Similarly, the hydrophobic block can be a mixture of ethylene oxide and propylene oxide repeating units. Such block copolymers are available under the tradename PLURADOT®.

The weight average molecular weight of poloxamers may vary within wide limits. An average molecular weight of, for example, from about 1000 to 20000, preferably from 1000 to 15000, more preferably from 1000 to 8000 and in particular from 1000 to 5000.

A branching agent of formula (2) is preferably a linear or branched $C_3$ to $C_{12}$ aliphatic polyol, more preferably a linear or branched $C_3$ to $C_8$ aliphatic polyol. The variable x in formula (2) is preferably a number from 3 to 12, more preferably a number from 3 to 8, even more preferably a number from 3 to 6, and most preferably the number 3.

Examples of a branching agent of formula (2) are glycerol, diglycerol, triglycerol, 1,1,1-trishydroxymethylethane, 1,1,1-trishydroxymethylpropane, 1,2,4-butanetriol, 1,2,6-hexanetriol, erythritol, pentaerythritol, di- or tripentaerythritol, arabitol, sorbitol, disorbitol or mannitol and mixtures thereof. Preferred compounds of formula (2) are glycerol, 1,1,1-tris-hydroxymethylpropane, 1,2,4-butanetriol, erythritol, pentaerythritol, arabitol or sorbitol. A group of preferred branching agents of formula (2) comprises glycerol, 1,1,1-tris-hydroxymethylpropane, pentaerythritol, and pentaerythritol ethoxylate.

Further suitable as a branching agent according to (b) are reaction products of the above-mentioned polyhydroxy compounds of formula (2) with a dicarboxylic acid or with a derivative of a dicarboxylic acid, e.g. a dicarboxylic acid anhydride, ester or halide, as well as a diol, whereby oligomeric polyester polyols are obtained, or reaction products of the above-mentioned polyhydroxy compounds with a glycol, whereby oligomeric polyether polyols are obtained.

Where at least one branching agent according to (b) is a polyester polyol, the branching agent is preferably an oligomeric reaction product of a compound of formula (2), wherein the above-mentioned meanings and preferences apply, with an aliphatic or cycloaliphatic dicarboxylic acid having 3 to 12 carbon atoms, or an aromatic dicarboxylic acid having 5 to 15 carbon atoms, or an appropriate derivative thereof, e.g. a corresponding dicarboxylic acid anhydride, ester or halide, as well as a diol as chain extender. Examples of suitable dicarboxylic acids are malonic acid, succinic acid, 2,2-dimethylsuccinic acid, glutaric acid, adipic acid, pimelic acid, sebacic acid, tetrahydrophthalic acid, hexahydrophthalic acid, phthalic acid, isophthalic acid, terephthalic acid, maleic acid or fumaric acid, as well as the corresponding dicarboxylic acid esters, halides or anhydrides. Appropriate diols are e.g. linear or branched $C_2$-$C_{20}$-alkyl-diols.

Where at least one branching agent according to (b) is a cycloaliphatic polyol, the branching agent may be e.g. cyclopentane or preferably a cyclohexane, which is respectively substituted by 3 to 5 and preferably by 3 or 4 hydroxy groups and bears no further substituents or hetero atoms. Further suitable cycloaliphatic polyols according to (b) are represented by unsubstituted mono- or disaccharides, e.g. glucose, fructose, mannose, galactose, maltose, lactose or saccharose.

In formula (3), y is preferably a number from 2 to 4, more preferably 2.

Where y is 2 in the formula (3), $R_5$ is the radical of a linear or branched $C_3$-$C_{18}$-alkylene, an unsubstituted or $C_1$-$C_4$-alkyl-substituted or $C_1$-$C_4$-alkoxy-substituted $C_6$-$C_{10}$-arylene, a $C_7$-$C_{18}$-aralkylene, a $C_6$-$C_{10}$-arylene-$C_1$-$C_2$-alkylene-$C_6$-$C_{10}$-arylene, a $C_3$-$C_8$-cycloalkylene, a $C_3$-$C_8$-cycloalkylene-$C_1$-$C_6$-alkylene, a $C_3$-$C_8$-cycloalkylene-$C_1$-$C_2$-alkylene-$C_3$-$C_8$-cycloalkylene, or a $C_1$-$C_6$-alkylene-$C_3$-$C_8$-cycloalkylene-$C_1$-$C_6$-alkylene.

Where $R_5$ is the radical of an alkylene, $R_5$ is preferably a linear or branched $C_4$-$C_{12}$-alkylene radical, more preferably a linear or branched $C_6$-$C_{10}$-alkylene radical. Examples of preferred alkylene radicals are 1,4-butylene, 2,2-dimethyl-1,4-butylene, 1,5-pentylene, 2,2-dimethyl-1,5-pentylene, 1,6-hexylene, 2,2,3- or 2,2,4-trimethyl-1,5-pentylene, 2,2-dimethyl-1,6-hexylene, 2,2,3- or 2,2,4- or 2,2,5-trimethyl-1,6-hexylene, 2,2-dimethyl-1,7-heptylene, 2,2,3- or 2,2,4- or 2,2,5- or 2,2,6-trimethyl-1,7-heptylene, 1,8-octylene, 2,2-dimethyl-1,8-octylene or 2,2,3- or 2,2,4- or 2,2,5- or 2,2,6- or 2,2,7-trimethyl-1,8-octylene.

Where $R_5$ is the radical of an arylene, the arylene is preferably naphthylene, more preferably phenylene. If the arylene is substituted, a substituent is preferably located in ortho position to an isocyanate group. Examples of substituted arylene are 1-methyl-2,4-phenylene, 1,5-dimethyl-2,4-diphenylene, 1-methoxy-2,4-phenylene or 1-methyl-2,7-naphthylene.

Where $R_5$ is the radical of an aralkylene, the aralkylene is preferably naphthylalkylene, more preferably phenylalkylene. The alkylene group in aralkylene preferably contains 1 to 12, more preferably 1 to 6, even more preferably 1 to 4, most preferably 1 to 2 C-atoms. A few examples are 1,3- or 1,4-benzylene, naphth-2-yl-7-methylene, 6-methyl-1,3- or -1,4-benzylene, 6-methoxy-1,3- or -1,4-benzylene.

Where $R_5$ is the radical of a cycloalkylene, the cycloalkylene is preferably $C_5$-$C_6$-cycloalkylene, more preferably cyclohexylene which is respectively unsubstituted or methyl-substituted. A few examples are 1,3-cyclobutylene, 1,3-cyclopentylene, 1,3- or 1,4-cyclohexylene, 1,3- or 1,4-cycloheptylene, 1,3- or 1,4- or 1,5-cyclooctylene, 4-methyl-1,3-cyclopentylene, 4-methyl-1,3-cyclohexylene, 4,4-dimethyl-1,3-cyclohexylene, 3-methyl- or 3,3-dimethyl-1,4-cyclohexylene, 3,5-dimethyl-1,3-cyclohexylene, 2,4-dimethyl-1,4-cyclohexylene.

Where $R_5$ is the radical of a cycloalkylene-alkylene, the cycloalkylene-alkylene is preferably cyclopentylene-$C_1$-$C_4$-alkylene, more preferably cyclohexylene-$C_1$-$C_4$-alkylene which is respectively unsubstituted or substituted once or several times by $C_1$-$C_4$-alkyl, especially methyl. The group cycloalkylene-alkylene preferably denotes cyclohexylene-ethylene and most preferably denotes cyclohexylene-methylene, which is respectively unsubstituted in the cyclohexylene radical or substituted by 1 to 3 methyl groups. A few examples are cyclopent-1-yl-3-methylene, 3-methyl-cyclopent-1-yl-3-methylene, 3,4-dimethyl-cyclopent-1-yl-3-methylene, 3,4,4-trimethyl-cyclopent-1-yl-3-methylene, cyclohex-1-yl-3- or -4-methylene, 3- or 4- or 5-methyl-cyclohex-1-yl-3- or -4-methylene, 3,4- or 3,5-dimethyl-cyclohex-1- yl-3- or -4-methylene, 3,4,5- or 3,4,4- or 3,5,5-trimethyl-cyclohex-1-yl-3- or -4-methylene.

Where $R_5$ is the radical of an alkylene-cycloalkylene-alkylene, the alkylene-cycloalkylene-alkylene is preferably $C_1$-$C_4$-alkylene-cyclopentylene-$C_1$-$C_4$-alkylene and especially $C_1$-$C_4$-alkylene-cyclohexylene-$C_1$-$C_4$-alkylene, which is respectively unsubstituted or substituted once or several times by $C_1$-$C_4$-alkyl, most preferably methyl. The group alkylene-cycloalkylene-alkylene preferably denotes ethylene-cyclohexylene-ethylene and most preferably methylene-cyclohexylene-methylene, which is respectively unsubstituted in the cyclohexylene radical or substituted by 1 to 3 methyl groups. A few examples are cyclopentane-1,3-dimethylene, 3-methyl-cyclopentane-1,3-dimethylene 3,4-dimethyl-cyclopentane-1,3-dimethylene, 3,4,4-trimethyl-cyclopentane-1,3-dimethylene, cyclohexane-1,3- or -1,4-dimethylene, 3- or 4- or 5-methyl-cyclohexane-1,3- or -1,4-dimethylene, 3,4- or 3,5-dimethyl-cyclohexane-1,3- or -1,4-dimethylene, 3,4,5- or 3,4,4- or 3,5,5-trimethyl-cyclohexane-1,3- or -1,4-dimethylene.

Where $R_5$ is the radial of a cycloalkylene-alkylene-cycloalkylene, the cycloalkylene-alkylene-cycloalkylene is preferably $C_5$-$C_6$-cycloalkylene-methylene-$C_5$-$C_6$-cycloalkylene, which may respectively be unsubstituted or substituted in the cycloalkyl ring by one or more methyl groups.

Where $R_5$ is the radial of an arylene-alkylene-arylene, the arylene-alkylene-arylene is preferably phenylene-methylene-phenylene, which may respectively be unsubstituted in the phenyl ring by one or more methyl groups.

Examples of especially preferred diisocyanates of formula (3) are isophorone diisocyanate (IPDI), methylenebis(cyclohexyl-isocyanate), 1,6-diisocyanato-2,2,4-trimethyl-n-hexane (TMDI), methylenebis(phenyl-isocyanate) or hexamethylene-diisocyanate (HMDI).

A prepolymer of the present invention is prepared by reacting an isocyanate-capped polyurethane of the present invention with an ethylenically unsaturated amine (primary or secondary amine) or an ethylenically unsaturated monohydroxy compound.

Examples of ethylenically unsaturated monohydroxy compound includes, without limitation, hydroxy-substituted lower alkylacrylates and -methacrylates, hydroxy-substituted lower alkyl-acrylamides and -methacrylamides, hydroxy-substituted lower alkylvinyl-ethers. Examples of hydroxy-substituted lower alkylacrylates and -methacrylates are 2-hydroxyethyl acrylate and 2-hydroxyethyl methacrylate.

An ethylenically unsaturated amine has formula (4), (4') or (4")

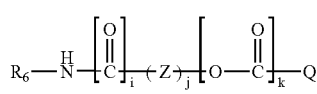

(4)

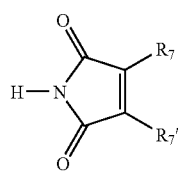

(4')

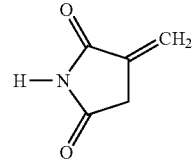

(4")

In which, i, j and k, independent of one another, are 0 or 1;

$R_6$ is hydrogen, a linear or branched $C_1$-$C_{24}$ alkyl, a $C_2$-$C_{24}$ alkoxyalkyl, a $C_2$-$C_{24}$ alkylcarbonyl, a $C_2$-$C_{24}$ alkoxycarbonyl, an unsubstituted or $C_1$-$C_4$ alkyl- or $C_1$-$C_4$ alkoxy-substituted $C_6$-$C_{10}$ aryl, a $C_7$-$C_{18}$ aralkyl, a $C_{13}$-$C_{22}$ arylalkylaryl, a $C_3$-$C_8$ cycloalkyl, a $C_4$-$C_{14}$ cycloalkylalkyl, a $C_7$-$C_{18}$ cycloalkylalkylcycloalkyl, a $C_5$-$C_{20}$ alkylcycloalkylalkyl, or an aliphatic-heterocyclic radical;

Z is a $C_1$-$C_{12}$ alkylene radical, phenylene radical or $C_7$-$C_{12}$ aralkylene radical;

$R_7$ and $R_7'$, independently of each other, are hydrogen, $C_1$-$C_4$ alkyl or halogen; and Q is an ethylenically unsaturated copolymerizable radical having from 2 to 24 carbon atoms which may be further substituted.

Aryl $R_6$ is a carbocyclic aromatic radical, which is unsubstituted or substituted by preferably lower alkyl ($C_1$-$C_4$) or lower alkoxy ($C_1$-$C_4$). Examples are phenyl, toluyl, xylyl, methoxyphenyl, t-butoxyphenyl, naphthyl or phenanthryl.

Cycloalkyl $R_6$ is preferably $C_5$-$C_6$ cycloalkyl and most preferably cyclohexyl that is unsubstituted or substituted by methyl. Some examples are cyclobutyl, cyclopentyl, cyclohexyl, cycloheptyl, cyclooctyl, 4-methyl-cyclopentyl, 4-methyl-cyclohexyl, 4,4-dimethyl-cyclohexyl, 3-methyl- or 3,3-dimethyl-cyclohexyl, 3,5-dimethyl-cyclohexyl and 2,4-dimethyl-cyclohexyl.

When $R_6$ is cycloalkylalkyl, it is preferably cyclopentyl-$C_1$-$C_4$ alkyl and especially cyclohexyl-$C_1$-$C_4$ alkyl, each unsubstituted or mono- or poly-substituted by $C_1$-$C_4$ alkyl, especially methyl. More preferably, the group cycloalkylalkyl is cyclohexylethyl and, most preferably, cyclohexylmethyl, each unsubstituted or substituted in the cyclohexyl radical by from 1 to 3 methyl groups.

When $R_6$ is alkylcycloalkylalkyl, it is preferably $C_1$-$C_4$ alkyl-cyclopentyl-$C_1$-$C_4$ alkyl and especially $C_1$-$C_4$ alkyl-cyclohexyl-$C_1$-$C_4$ alkyl, each unsubstituted or mono- or poly-substituted by $C_1$-$C_4$ alkyl, especially methyl. More preferably, the group alkylcycloalkylalkyl is ethylcyclohexylethyl and, most preferably, is methylcyclohexylmethyl, each unsubstituted or substituted in the cyclohexyl radical by from 1 to 3 methyl groups.

When $R_6$ is cycloalkylalkylcycloalkyl or arylalkylaryl, it is preferably $C_5$-$C_6$ cycloalkyl-methyl-$C_5$-$C_6$ cycloalkyl or phenylmethylphenyl, each of which may be unsubstituted or substituted in the cycloalkyl or phenyl ring by one or more methyl groups.

Suitable substituents on the ethylenically unsaturated $C_2$-$C_{24}$ radical Q are, for example, $C_1$-$C_4$ alkoxy, halogen, phenyl or carboxy.

Q is, for example, a radical of formula

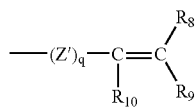
(5)

wherein q is the number 0 or 1, each of $R_8$ and $R_9$ independently of the other is hydrogen, $C_1$-$C_4$ alkyl, phenyl, carboxy or halogen, $R_{10}$ is hydrogen, $C_1$-$C_4$ alkyl or halogen, and Z' is linear or branched $C_1$-$C_{12}$ alkylene or unsubstituted or $C_1$-$C_4$ alkyl- or $C_1$-$C_4$ alkoxy-substituted phenylene or $C_7$-$C_{12}$ aralkylene.

When Z' is a phenylene radical, it is, for example, unsubstituted or methyl- or methoxy-substituted 1,2-, 1,3- or 1,4-phenylene. Preferably, Z' as a phenylene radical is 1,3- or 1,4-phenylene.

When Z' is an aralkylene radical, it is, for example, unsubstituted or methyl- or methoxy-substituted benzylene, wherein the methylene group is bonded to the amine nitrogen in each case. Preferably, Z' as an aralkylene radical is the 1,3- or 1,4-phenylenemethylene radical, wherein the methylene group is bonded to the amine nitrogen —NH— in each case.

Z' is preferably unsubstituted or methyl- or methoxy-substituted phenylene or phenylenemethylene or $C_1$-$C_{12}$alkylene, more preferably 1,3- or 1,4-phenylene or $C_1$-$C_6$alkylene, especially $C_1$-$C_2$alkylene and most preferably methylene.

q is the number 1 or, preferably, the number 0.

$R_{10}$ is preferably hydrogen, methyl or chlorine and most preferably hydrogen or methyl.

Each of $R_8$ and $R_9$, independently of the other, is preferably hydrogen, carboxy, chlorine, methyl or phenyl. In a preferred embodiment of the invention, $R_8$ is hydrogen, chlorine, methyl or phenyl and $R_9$ is hydrogen or carboxy. Most preferably, $R_8$ and $R_9$ are each hydrogen.

Especially preferred radicals Q correspond to formula (5) wherein p is 0, $R_{10}$ is hydrogen or methyl, $R_8$ is hydrogen, methyl, chlorine or phenyl and $R_9$ is hydrogen or carboxy.

Other especially preferred radicals Q correspond to the above formula (5) wherein p is 1, Z' is 1,3- or 1,4-phenylene or $C_1$-$C_6$ alkylene, especially $C_1$-$C_2$ alkylene, $R_{10}$ is hydrogen or methyl and $R_8$ and $R_9$ are each hydrogen.

Examples of suitable radicals Q are vinyl, 2-propenyl, allyl, 2-butenyl, o-, m- or p-vinylphenyl, vinylphenyl, vinylnaphthyl, allylphenyl, styryl, 2-carboxyvinyl, 2-chloro-2-carboxyvinyl, 1,2-dichloro-2-carboxyvinyl, 1,2-dimethyl-2-carboxyvinyl and 2-methyl-2-carboxyvinyl.

Examples of suitable ethylenically unsaturated amine are 2-(ter-butylamino)ethylmethacrylate (TBAM), and vinyl aniline.

One preferred embodiment of the radiation-curable prepolymers used according to the invention relates to those obtained from isocyanate-capped polyurethanes which are the copolymerization product of (a) one or more polyalkylene glycols of formula

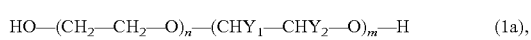
(1a), wherein one of radicals $Y_1$ and $Y_2$ signifies methyl and the other radical signifies hydrogen, and n and m, independently of one another, each denote a number from 0 to 50, wherein the sum of (n+m) is 8 to 50, (b) one or more linear or branched aliphatic polyhydroxy compounds of formula $$R_4\text{—(OH)}_x \qquad (2)$$

wherein $R_4$ is a linear or branched $C_3$-$C_{18}$ aliphatic multivalent radical and x is a number from 3 to 8, and (c) one or more diisocyanates of formula $$\text{OCN—R}_5\text{—NCO} \qquad (3a),$$

wherein $R_5$ is a linear or branched $C_3$-$C_{18}$-alkylene, an unsubstituted or $C_1$-$C_4$-alkyl-substituted or $C_1$-$C_4$-alkoxy-substituted $C_6$-$C_{10}$-arylene, a $C_7$-$C_{18}$-aralkylene, a $C_6$-$C_{10}$-arylene-$C_1$-$C_2$-alkylene-$C_6$-$C_{10}$-arylene, a $C_3$-$C_8$-cyclo-alkylene, a $C_3$-$C_8$-cycloalkylene-$C_1$-$C_6$-alkylene, a $C_3$-$C_8$-cycloalkylene-$C_1$-$C_2$-alkylene-$C_3$-$C_8$-cycloalkylene, or a $C_1$-$C_6$-alkylene-$C_3$-$C_8$-cycloalkylene-$C_1$-$C_6$-alkylene.

Another preferred embodiment of the radiation-curable prepolymers used according to the invention relates to those obtained from isocyanate-capped polyurethanes which are the copolymerization product of (a) at least one poly(ethylene glycol) (i.e., in formula (1a), m is zero.) and at least one hydroxy-terminated poly (ethylene glycol)-poly(propylene glycol)-poly(ethylene glycol) or poly(propylene glycol)-poly(ethylene glycol)-poly(propylene glycol) tri-block copolymers, (b) one or more linear or branched aliphatic polyhydroxy compounds of formula $$R_4\text{—(OH)}_x \qquad (2)$$

wherein $R_4$ is a linear or branched $C_3$-$C_{18}$ aliphatic multivalent radical and x is a number from 3 to 8, and (c) one or more diisocyanates of formula $$\text{OCN—R}_5\text{—NCO} \qquad (3a),$$

wherein $R_5$ is a linear or branched $C_3$-$C_{18}$-alkylene, an unsubstituted or $C_1$-$C_4$-alkyl-substituted or $C_1$-$C_4$-alkoxy-substituted $C_6$-$C_{10}$-arylene, a $C_7$-$C_{18}$-aralkylene, a $C_6$-$C_{10}$-arylene-$C_1$-$C_2$-alkylene-$C_6$-$C_{10}$-arylene, a $C_3$-$C_8$-cyclo-alkylene, a $C_3$-$C_8$-cycloalkylene-$C_1$-$C_6$-alkylene, a $C_3$-$C_8$-cycloalkylene-$C_1$-$C_2$-alkylene-$C_3$-$C_8$-cycloalkylene, or a $C_1$-$C_6$-alkylene-$C_3$-$C_8$-cycloalkylene-$C_1$-$C_6$-alkylene.

A more preferred embodiment of the radiation-curable prepolymers used according to the invention relates to those obtained from isocyanate-capped polyurethanes which are the polymerization product of (a) one or more polyalkylene glycols of formula $$\text{HO—(CH}_2\text{—CH}_2\text{—O)}_n\text{—(CHY}_1\text{—CHY}_2\text{—O)}_m\text{—H} \qquad (1a),$$

wherein one of radicals $Y_1$ and $Y_2$ signifies methyl and the other radical signifies hydrogen, and n and m, independently of one another, each denote a number from 0 to 25, wherein the sum of (n+m) is 9 to 25, (b) one or more polyhydroxy compounds selected from the group consisting of glycerol, diglycerol, triglycerol, 1,1,1-trishydroxymethylethane, 1,1,1-trishydroxymethylpropane, 1,2,4-butanetriol, 1,2,6-hexanetriol, erythritol, pentaerythritol, di- and tripentaerythritol, arabitol, sorbitol, disorbitol and mannitol and mixtures thereof, and (c) a diisocyanate of formula $$\text{OCN—R}_5\text{—NCO} \qquad (3a),$$

wherein $R_5$ signifies linear or branched $C_6$-$C_{10}$-alkylene, cyclohexylene-methylene or cyclohexylene-methylene-cyclohexylene either unsubstituted or substituted in the cyclohexyl moiety by 1 to 3 methyl groups, or phenylene or phenylene-methylene-phenylene either unsubstituted or substituted in the phenyl moiety by methyl.

Another more preferred embodiment of the radiation-curable prepolymers used according to the invention relates to those obtained from isocyanate-capped polyurethanes which are the polymerization product of (a) at least one poly(ethylene glycol) (i.e., in formula (1a), m is zero.) and at least one hydroxy-terminated poly(ethylene glycol)-poly(propylene glycol)-poly(ethylene glycol) or poly(propylene glycol)-poly(ethylene glycol)-poly(propylene glycol) tri-block copolymers, (b) one or more polyhydroxy compounds selected from the group consisting of glycerol, diglycerol, triglycerol, 1,1,1-trishydroxymethylethane, 1,1,1-trishydroxymethylpropane, 1,2,4-butanetriol, 1,2,6-hexanetriol, erythritol, pentaerythritol, di- and tripentaerythritol, arabitol, sorbitol, disorbitol and mannitol and mixtures thereof, and (c) a diisocyanate of formula

OCN—$R_5$—NCO         (3a), wherein $R_5$ signifies linear or branched $C_6$-$C_{10}$-alkylene, cyclohexylene-methylene or cyclohexylene-methylene-cyclohexylene either unsubstituted or substituted in the cyclohexyl moiety by 1 to 3 methyl groups, or phenylene or phenylene-methylene-phenylene either unsubstituted or substituted in the phenyl moiety by methyl.

The isocayanate-capped polyurethane polymers according to the invention may be produced by following a solventless process.

For example, in a solventless process, first one or more polyalkylene glycols of formula (1) (component (a)) is mixed with one or more branching agents (component (b)) and the mixture is heated to and maintained at a melting temperature or above. Then, at least one di- or polyisocyanate of formula (3) (component (c)) is added to the melted mixture to make a melted reaction mixture comprising component (a), component (b) and component (c) in a desired stoichiometry. The temperature of the melted reaction mixture is continuously and thoroughly stirred at the melting temperature or above and preferably under an inert atmospheric environment (for example, in nitrogen or argon atmosphere). Reaction is monitored by, for example, monitoring the isocyanate peak in FT-IR spectroscopy.

Components (a)-(c) are all known compounds or compound mixtures, or may be obtained in accordance with methods known per se.

It should be understood that components (a), (b), and (c) can be mixed together in a desired stoichiometry and the mixture then can be melted and maintained at a melting temperature or above to start reaction.

The stoichiometry of components (a), (b) and (c) in the melted reaction mixture is advantageously chosen so that the number of NCO equivalents of component (c) is greater than the sum of OH equivalents of components (a) and (b). Preferably, the stoichiometry of components (a), (b) and (c) in the melted reaction mixture is chosen so that the molar ratio of component (a) to component (b) to component (c) is about 4:1:7.

It should be further understood that the isocayanate-capped polyurethane polymers according to the invention may be produced by reacting components (a), (b), and (c) and optionally additional copolymerizable monomers in an inert solvent at a temperature of e.g. 30° C. to 150° C.

Suitable inert solvents are aprotic, preferably polar solvents, for example hydrocarbon halides (chloroform, methylene chloride, trichloroethane, tetrachloroethane, chlorobenzene), ethers (tetrahydrofuran, dioxane), ketones (acetone, ethyl methyl ketone, dibutyl ketone, methyl isobutyl ketone), carboxylic acid esters and lactones (ethyl acetate, butyrolactone, valerolactone), alkylated carboxylic acid amides (N,N-dimethylacetamide, N-methylpyrrolidone), nitriles (acetonitrile), sulphones and sulphoxides (dimethyl sulphoxide, tetramethylene sulphone). Polar solvents are preferably employed.

Furthermore, it is preferable for the reaction of the hydroxy-group-containing components (a) and (b) with the isocyanate-group-containing components (c) to be carried out in the presence of a catalyst, since the reaction time can be shorten. Suitable catalysts are for example metal salts such as alkali metal salts or tin salts of organic carboxylic acids, or tertiary amines, for example, $(C_1$-$C_6$-alkyl$)_3$N (triethylamine, tri-n-butylamine), N-methylpyrrolidine, N-methylmorpholine, N,N-dimethylpiperidine, pyridine or 1,4-diaza-bicyclooctane. Tin salts have proved to be particularly effective, especially alkyl-tin salts of carboxylic acids, for example dibutyl tin dilaurate (DBTDL) and tin dioctoate.

The catalyst is employed in the reaction e.g. in a molar ratio of 1:10 to 1:1000, preferably 1:50 to 1:750, most preferably ca. 1:100 to 1:500, respectively based on component (a).

The reaction times may vary within a broad range, whereby progress of the reaction can be followed well by monitoring the reduction of the isocyanate content in the reaction mixture.

It is particularly preferred that the isocyanate-capped polyurethane polymers of the invention is produced in a solventless process. By using a solventless process, the production cost associated with solvent and its disposal can be eliminated.

Once the reaction of components (a) and (b) with component (c) is completed, the obtained isocyanate-capping polyurentane can be reacted directly with an ethylenically unsaturated amine (primary or secondary amine) and an ethylenically unsaturated monohydroxy compound, to prepare a radiation-curable polyurethane prepolymer of the invention. Optionally, the obtained isocyanate-capping polyurentane can be purified before reacting with a radiation-curable group-capping agent.

Isolation and purification of the radiation-curable polyurethane prepolymer are effected by known processes, for example extraction, crystallization, re-crystallization, ultra-filtration or by chromatographic purification methods. The compounds are obtained in high yields and high purity.

In another aspect, the present invention relates to a solventless process for the production of a radiation-curable polyurethane prepolymers. The method comprises the steps of: (I) preparing a melted reaction mixture comprising one or more polyalkylene glycols of formula (1) (component (a)), one or more branching agents (component (b)), and at least one di- or polyisocyanate of formula (3) (component (c)), wherein the stoichiometry of components (a), (b) and (c) in the melted reaction mixture is chosen so that the number of NCO equivalents of component (c) is greater than the sum of OH equivalents of components (a) and (b); (II) reacting components (a) and (b) with component (c) in the melted reaction mixture at a desired temperature to form an isocyanate-capping polyurethane; and (III) reacting the formed isocyanate-capping polyurethane, without intermediate isolation, with a radiation-curable group-capping agent, which is an ethylenically unsaturated amine (primary or secondary amine) of formula (4), (4') or (4") or an ethylenically unsaturated monohydroxy compound, to prepare the radiation-curable polyurethane prepolymer of the invention.

The prepolymers according to the invention are radiation-curable, but uncrosslinked or at least substantially uncrosslinked; nevertheless, they are stable, i.e. spontaneous crosslinking due to homopolymerization does not take place substantially. The term "radiation-curable" in reference to a prepolymer means that the prepolymer can be crosslinked or polymerized by actinic radiation, including, for example, UV radiation, ionizing radiation such gamma radiation or X-rays, microwave, and the like.

The radiation-curable prepolymers are advantageously liquid or readily meltable or water-soluble; the radiation-curable prepolymers are most preferably water-soluble. The average molecular weight of the radiation-curable prepolymers according to the invention may vary within a broad range. An average molecular weight of e.g. 1000 to 50,000 has proved to be advantageous for the radiation-curable prepolymers according to the invention.

Furthermore, the radiation-curable prepolymers according to the invention may be purified in a manner known per se, for example by precipitation with acetone, dialysis or preferably by ultrafiltration. As a result of this purification procedure, the radiation-curable prepolymers according to the invention may be obtained in extremely pure form, e.g. as solvent-free liquids or melts or as concentrated aqueous solutions, which are free from or at least substantially free from reaction products such as salts, and from starting materials or other non-polymeric constituents.

The preferred purifying process for the prepolymers according to the invention, ultrafiltration, may be carried out in a manner known per se. Thus, it is possible to carry out ultrafiltration repeatedly, for example two to ten times. Alternatively, ultrafiltration may also be carried out continuously, until reaching the desired degree of purity. The desired degree of purity may be basically selected at any level, and is preferably set so that the content of undesired constituents in the prepolymers is e.g. $\leq 0.001\%$, most preferably $\leq 0.0001\%$ (1 ppm). As a result of their synthesis, the prepolymers may additionally contain constituents which are acceptable from a physiological point of view, e.g. sodium chloride, whereby such constituents are advantageously present in an amount of $\leq 1\%$, preferably $\leq 0.1\%$, most preferably $\leq 0.01\%$.

In another aspect, the present invention relates to a polymer which is a product of crosslinking of a radiation-curable prepolymer of the invention (described-above) in the presence or preferably in the absence of one or more additional vinylic comonomers. As already mentioned above, the radiation-curable prepolymers according to the invention may be crosslinked in an extremely effective and well-directed manner upon actinic irradiation, in particular by UV irradiation. Crosslinking may take place in the presence or preferably in the absence of an additional vinylic comonomer. The resulting crosslinked polymers are insoluble in water.

In a further aspect, the present invention provides a medical device, preferably an ophthalmic device, more preferably a contact lens, which is obtained by crosslinking an above-described radiation-curable prepolymer of the invention in the presence of or preferably in the absence of one or more additional vinylic comonomers.

A "medical device", as used herein, refers to a device having surfaces that contact tissue, blood, or other bodily fluids of patients in the course of their operation or utility. Exemplary medical devices include: (1) extracorporeal devices for use in surgery such as blood oxygenators, blood pumps, blood sensors, tubing used to carry blood and the like which contact blood which is then returned to the patient; (2) prostheses implanted in a human or animal body such as vascular grafts, stents, pacemaker leads, heart valves, and the like that are implanted in blood vessels or in the heart; (3) devices for temporary intravascular use such as catheters, guide wires, and the like which are placed into blood vessels or the heart for purposes of monitoring or repair; and (4) ophthalmic devices. In a preferred embodiment, medical devices are ophthalmic devices.

An "ophthalmic device", as used herein, refers to a contact lens (hard or soft), an intraocular lens, a corneal onlay, and other ophthalmic devices (e.g., stents, or the like) used on or about the eye or ocular vicinity.

In the case of photo-crosslinking, a photo-initiator is suitably added which can initiate radical crosslinking. Examples of these are familiar to the person skilled in the art, and suitable photo-initiators which may be mentioned in particular are benzoin-methylether, 1-hydroxy-cyclo-hexyl-phenylketone, Darocure® 1173 or Irgacure® types. Crosslinking may be commenced by actinic radiation, e.g. UV light, or by ionized radiation, e.g. gamma rays or X-rays.

Photo-crosslinking may also be carried out without adding a solvent, e.g. if the radiation-curable prepolymer is a liquid or readily meltable prepolymer, or it takes place in a suitable solvent. Suitable solvents are basically all solvents that dissolve the radiation-curable prepolymers according to the invention and optionally the additional vinylic comonomers, e.g. water, alcohols such as lower alkanols, e.g. ethanol or methanol, furthermore carboxylic acid amides, such as dimethyl-formamide, or dimethyl sulphoxide, and likewise mixtures of suitable solvents, e.g. mixtures of water with an alcohol, such as a water/ethanol or a water/methanol mixture.

Photo-crosslinking is preferably effected whilst solvent-free or essentially solvent-free or directly from an aqueous solution of the prepolymers according to the invention, which may be obtained as the result of the preferred purification step, ultrafiltration, optionally after adding an additional vinylic comonomers. For example, photo-crosslinking may be undertaken from a 15 to 90% aqueous solution.

The process for the production of the crosslinked polymers according to the invention comprises radiation-crosslinking a radiation-curable prepolymer of the invention and optionally further copolymerizable monomers, especially in substantially pure form, i.e. for example after ultrafiltration once or several times whilst solvent-free or substantially solvent-free or in solution, especially in aqueous solution, in the presence or preferably in the absence of an additional vinylic comonomer, preferably using a photo-initiator.

The vinylic comonomer which may be additionally used for photo-crosslinking in accordance with the invention may be hydrophilic, hydrophobic or may be a mixture of a hydrophobic and a hydrophilic vinylic monomer. Suitable vinylic monomers include especially those normally used for the manufacture of contact lenses. A "hydrophilic vinylic monomer" refers to a monomer which as a homopolymer typically yields a polymer that is water-soluble or can absorb at least 10 percent by weight water. A "hydrophobic vinylic monomer" refers to a monomer which as a homopolymer typically yields a polymer that is insoluble in water and can absorb less than 10 percent by weight water.

It is preferable to use a hydrophobic vinylic comonomer, or a mixture of a hydrophobic vinylic comonomer with a hydrophilic vinylic comonomer, whereby this mixture contains at least 50 percent by weight of a hydrophobic vinyl comonomer. In this way, the mechanical properties of the polymer may be improved without the water content dropping substantially. What basically applies is that both conventional hydrophobic vinylic comonomers and conventional hydrophilic vinylic comonomers are suitable for copolymerization with the radiation-curable prepolymers according to the invention.

Suitable hydrophobic vinylic comonomers include, without limitation, $C_1$-$C_{18}$-alkylacrylates and -methacrylates, $C_3$-$C_{18}$ alkylacrylamides and -methacrylamides, acrylonitrile, methacrylonitrile, vinyl-$C_1$-$C_{18}$-alkanoates, $C_2$-$C_{18}$-alkenes, $C_2$-$C_{18}$-halo-alkenes, styrene, $C_1$-$C_6$-alkylstyrene, vinylalkylethers in which the alkyl moiety has 1 to 6 carbon atoms, $C_2$-$C_{10}$-perfluoralkyl-acrylates and -methacrylates or correspondingly partially fluorinated acrylates and methacrylates, $C_3$-$C_{12}$-perfluoralkyl-ethyl-thiocarbonylaminoethyl-acrylates and -methacrylates, acryloxy and methacryloxy-alkylsiloxanes, N-vinylcarbazole, $C_1$-$C_{12}$-alkylesters of maleic acid, fumaric acid, itaconic acid, mesaconic acid and the like. Preference is given e.g. to $C_1$-$C_4$-alkylesters of vinylically unsaturated carboxylic acids with 3 to 5 carbon atoms or vinylesters of carboxylic acids with up to 5 carbon atoms.

Examples of suitable hydrophobic vinylic comonomers include methylacrylate, ethylacrylate, propylacrylate, isopropylacrylate, cyclohexylacrylate, 2-ethylhexylacrylate, methylmeth-acrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate, tris-trimethyl-silyloxy-silyl-propyl methacrylate, 3-methacryloxypropyl-pentamethyl-disiloxane and bis(methacryloxypropyl)-tetramethyl-disiloxane.

Suitable hydrophilic vinylic comonomers include, without limitation, hydroxy-substituted lower alkylacrylates and -methacrylates, acrylamide, methacrylamide, lower alkyl-acrylamides and -methacrylamides, ethoxylated acrylates and methacrylates, hydroxy-substituted lower alkyl-acrylamides and -methacrylamides, hydroxy-substituted lower alkylvinyl-ethers, sodium ethylene sulphonate, sodium styrene sulphonate, 2-acrylamido-2-methyl-propane-sulphonic acid, N-vinyl pyrrole, N-vinyl succinimide, N-vinyl pyrrolidone, 2- or 4-vinyl pyridine, acrylic acid, methacrylic acid, amino- (whereby the term "amino" also includes quaternary ammonium), mono-lower-alkylamino- or di-lower-alkylamino-lower-alkyl-acrylates and -methacrylates, allyl alcohol and the like. Preference is given e.g. to hydroxy-substituted $C_2$-$C_4$-alkyl(meth)acrylates, five- to seven-membered N-vinyl-lactams, N,N-di-$C_1$-$C_4$-alkyl-methacrylamides and vinylically unsaturated carboxylic acids with a total of 3 to 5 carbon atoms.

Examples of suitable hydrophilic vinylic comonomers include hydroxyethyl methacrylate, hydroxyethyl acrylate, acrylamide, methacrylamide, dimethylacrylamide, allyl alcohol, vinyl pyridine, vinyl pyrrolidone, glycerol methacrylate, N-(1,1-dimethyl-3-oxobutyl)acrylamide, and the like.

Preferred hydrophobic vinylic comonomers are methyl methacrylate and vinyl acetate. Preferred hydrophilic vinylic comonomers are 2-hydroxyethyl methacrylate, N-vinyl pyrrolidone and acrylamide.

The processing according to the invention for molding radiation-curable prepolymers into ophthalmic articles, especially contact lenses, may take place in a manner known per se, for example, photo-crosslinking of the radiation-curable prepolymers according to the invention in an appropriate contact lens mold. Further examples of molded articles according to the invention, apart from contact lenses, are e.g. intra-ocular lenses or eye dressings, furthermore biomedical articles which may be used in surgery, such as heart valves, artificial arteries or the like, also films or membranes, e.g. membranes for diffusion control, photostructurable films for data storage, or photo resist materials, e.g. membranes or molded articles for etch resist printing or screen resist printing.

In another further aspect, the present invention provides a method for producing an ophthalmic device, the method comprising the steps of: a) introducing an above-described radiation-curable prepolymer of the invention, which is liquid or readily meltable at room temperature, and which is essentially free from solvents, into a mold, in the presence or preferably in the absence of one or more additional vinylic comonomers, and optionally in the presence of a photo-initiator, b) crosslinking by actinic radiation the radiation-curable prepolymer, and c) opening the mold so that the device can be removed from the mold.

In a still further aspect, the present invention provides a method for producing an ophthalmic device, the method comprising the steps of: a) introducing an aqueous solution of an above-described radiation-curable prepolymer of the invention, in the presence or preferably in the absence of one or more additional vinylic comonomers, and optionally in the presence of a photo-initiator, into a mold; b) crosslinking by actinic radiation the radiation-curable prepolymer, and c) opening the mold so that the device can be removed from the mold.

The radiation-curable prepolymers according to the invention may be introduced into a mold by methods known per se, especially conventional dispensing, e.g. dropwise addition. If vinylic comonomers are present, the comonomers employed are those mentioned above, in desired quantities. Any vinylic comonomers that are optionally present are advantageously first of all mixed with the prepolymer according to the invention and then introduced into the mold.

Appropriate molds are made, for example, from polypropylene. Suitable materials for re-usable mounds are e.g. quartz, sapphire glass or metals.

If the molded articles to be produced are contact lenses, these may be produced in a manner known per se, e.g. in a conventional "spin-casting mold", as described for example in U.S. Pat. No. 3,408,429, or by the so-called full mold process in a static form, as described e.g. in U.S. Pat. Nos. 4,347,198, 5,508,317, 5,583,463, 5,789,464, and 5,849,810.

Crosslinking may be initiated in the mold e.g. by means of actinic radiation, such as UV irradiation, ionizing radiation (e.g., gamma or X-ray irradiation).

As already mentioned, photo-crosslinking is advantageously carried out in the presence of a photo-initiator which can initiate radical crosslinking. The photo-initiator is advantageously added to the prepolymers according to the invention prior to introducing them into the mold, preferably by mixing the polymers and the photo-initiator together. The amount of photo-initiator may be selected from a wide range, whereby an amount of up to 0.05 g/g polymer and especially up to 0.003 g/g polymer has proved favorable.

What is notable is that the crosslinking according to the invention may be effected in a very short time, e.g. in ≦60 minutes, advantageously in ≦20 minutes, preferably in ≦10 minutes, most preferably in ≦5 minutes, particularly preferably in 1 to 60 seconds and most particularly in 1 to 30 seconds.

Opening of the mold so that the molded article can be removed from the mold may take place in a manner known per se.

If the molded article produced according to the invention is a contact lens which is produced solvent-free from an already purified prepolymer according to the invention, then after removal of the molded article, it is not normally necessary to follow up with purification steps such as extraction. This is because the prepolymers employed do not contain any undesired constituents of low molecular weight; consequently, the crosslinked product is also free or substantially free from such constituents and subsequent extraction can be dispensed with. Accordingly, the contact lens can be directly transformed in the usual way, by hydration, into a ready-to-use contact lens. Appropriate embodiments of hydration are known to the person skilled in the art, whereby ready-to-use contact lenses with very varied water content may be obtained. The contact lens is expanded, for example, in water, in an aqueous salt solution, especially an aqueous salt solution having an osmolarity of about 200 to 450 milli-osmole in 1000 ml (unit: mOsm/ml), preferably about 250 to 350 mOsm/l and especially about 300 mOsm/l, or in a mixture of water or an aqueous salt solution with a physiologically compatible polar organic solvent, e.g. glycerol. Preference is given to expansions of the article in water or in aqueous salt solutions.

The aqueous salt solutions used for hydration are advantageously solutions of physiologically compatible salts, such as buffer salts conventionally used in the field of contact lens care, e.g. phosphate salts, or isotonizing agents conventionally used in the field of contact lens care, such as in particular alkali halides, e.g. sodium chloride, or solutions of mixtures thereof. One example of an especially suitable salt solution is an artificial, preferably buffered lachrymal fluid, which is adapted to natural lachrymal fluid as regards pH value and osmolarity, e.g. an unbuffered or preferably buffered common salt solution, for example buffered by phosphate buffer, whose osmolarity and pH value correspond to the osmolarity and pH value of human lachrymal fluid.

The above-defined hydration fluids are preferably pure, i.e. free or substantially free from undesired constituents. This is most preferably pure water or an artificial lachrymal fluid as described above.

If the molded article produced according to the invention is a contact lens which is produced from an aqueous solution of an already purified prepolymer according to the invention, then the crosslinked product also does not contain any troublesome impurities. It is therefore not necessary to carry out subsequent extraction. Since crosslinking is carried out in an essentially aqueous solution, it is additionally unnecessary to carry out subsequent hydration. The contact lenses obtainable by this process are therefore notable, according to an advantageous embodiment, for the fact that they are suitable for their intended usage without extraction. By intended usage is understood, in this context, that the contact lenses can be used in the human eye.

The contact lenses obtained according to the invention have a wide range of unusual and extremely advantageous properties. One of these properties which may be named is for example its excellent compatibility with the human cornea, which is based on a well-balanced relationship between water content, oxygen permeability and good mechanical properties including elasticity and durability. Moreover, the contact lenses according to the invention have high resistance of shape. No changes in shape can be detected even after autoclaving at e.g. about 120° C.

What is also notable is that the contact lenses according to the invention can be produced from a radiation-curable prepolymer in a very simple and efficient way compared with the prior art. This is based on many factors. On the one hand, the starting materials may be acquired or produced inexpensively. Secondly, there is the advantage that the prepolymers are surprisingly stable, so that they may undergo a high degree of purification. Therefore, for crosslinking, a polymer may be used which requires practically no more subsequent purification, such as in particular complicated extraction of unpolymerized constituents. Furthermore, crosslinking may take place solvent-free or in aqueous solution, so that a subsequent solvent exchange or the hydration step is not necessary. Finally, photo-polymerization is effected within a short period, so that from this point of view also the production process for the contact lenses according to the invention may be set up in an extremely economic way.

Of course, all the above-mentioned advantages apply not only to contact lenses, but also to other molded articles according to the invention. The total of the different advantageous aspects during production of the molded articles according to the invention leads to the suitability of the molded articles in particular as mass-produced articles, for example, as contact lenses which are for daily use and/or for weekly use.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

EXAMPLE 1

General Procedures

PEG, Poly(THF)-650, IPDI, and TMP are purchased from Aldrich Chemical. Pluronic and reverse Pluronic products are obtained from BASF. Irgacure 2959 is obtained from CIBA specialty corporation.

FT-IR spectra are recorded on a BioRad FTS-175 spectrometer. Samples for IR analysis are prepared be smearing neat poly(urethane) samples between NaCl disks.

Molecular sieves are activated by heating them at about 400° C. for several hours and then stored in a desiccator.

Unless otherwise stated, viscosity is measured at 30 RPM, # 16 spindle, at 25° C. using a Brookfield viscometer. The sample is centrifuged for 15 minutes at 4000 RPM prior to viscosity measurement.

The percentage of NCO in samples is determined by titration Using Mettler Toledo Autotitrator.

Pin Hole Test are carried out as follows: Lenses are punctured with a 22 gauge needle, folded in half and then rolled 2-3 times between fingers. If a lenses does not fracture, it is given a Pass rating.

The water contents (%) of contact lenses are measured using an ATAGO CL-1 Refractometer or an ATAGO N2-E Refractometer.

Tensile properties (stress at break, elongation at break, and modulus) are measured using Lloyd Instrument Tester L-500 or equivalent and Lioyd Cell 5N, Class 0.5 or equvalent, with a strain rate of 200 mm/minute.

EXAMPLE 2

Preparation of Isocyanate-capped Polyurethane Polymer

To a 60° C. melt consisting of PEG-1000 (84.53 g), Pluronic 17R2 (9.480 g), TMP (2.983 g) and IPDI (34.690 g) is added dibutyltindilaurate (DBTDL) (0.65 g). The temperature of the reaction mixture increased to about 90° C. due to the exothermicity of the isocyante polyol reactions. About 30 minutes after the addition of the DBTDL titration of NCO revealed that conversion of isocyanate is close to the theoretically predicted value. FT-IR analysis of the sample showed an NCO peak near 2267 $cm^{-1}$ and a urethane peak near 1720 $cm^{-1}$.

Preparation of Radiation-curable Prepolymer

Approximately 14.47 grams of poly(urethane) 1525-68 is mixed with 1.30 grams of TBAM at room temperature. The sample is checked by FT-IR and additional TBAM is added until the isocyante peak is no longer visible. A 30% solids water solution of photocurable poly(urethane) is prepared by adding 37.40 grams of an aqueous solution containing 0.043% Irgacure 2959. The sample is centrifuged for about 10 minutes at 4000 RPM and then chilled.

Lens Preparation

Contact lenses are prepared from aqueous solutions containing about 30 weight percent polymer and 0.05 weight percent of Irgacure 2959. Poly(propylene) molds (FreshLook casting cups) are filled with poly(urethane) solution, and cured for 10 seconds at about 2.5 $mW/cm^2$. Lenses are removed from the molds, placed in glass vials containing isotonic borate buffered saline (saline solution contained 0.005% poloxomer) and then sterilized.

EXAMPLE 3

Preparation of Isocyanate-capped Poly(urethane)

PEG-900 (75.03 g), Pluronic 17R2 (9.355 g), TMP (2.216 g) are combined and allowed to melt at 60° C. The melt is dried over 3A activated molecular seives for about 20 hours. To the melt is added IPDI (32.40 g) and 0.63 g of dibutlyt-indilaurate (DBTDL). The temperature of the reaction mixture increased to about 90° C. soon after the addition of DBTDL. The reaction mixture is allowed to continue heating in a 60° C. oven for about 2 hours. The percent NCO in the sample is determined by titration to be close to the theoretically predicted value.

Preparation of Radiation-curable Prepolymer

About 14.95 grams of Poly(urethane) 1525-66 is mixed at room temperature with 1.95 grams of TBAM. The sample is analyzed by FT-IR and additional TBAM is added dropwise until NCO is no longer present in FT-IR spectra. A 30% solids water solution of photocurable poly(urethane) is prepared by adding 39.41 grams of an aqueous solution containing 0.043% Irgacure 2959. The sample is centrifuged for about 10 minutes at 4000 RPM and then chilled.

Lens Preparation

Poly(propylene) lens molds are filled with about 75 microliters of polymer solution and then closed. Poly(urethane) solutions are cured by subjecting the filled molds to about 2.2 $mW/cm2$ UV light (Light Stream lamp) for about 10 seconds. Molds are opened and lenses are placed in borate buffered saline. Lenses are then sterilized in an autoclave. Properties of lenses are given in table 3

EXAMPLE 4

Isocyanate-capped poly(urethane) is prepared according to the precedure described in Example 2. The stoichiometry of PEG-1000, pluronic 17R2, TMP, and IPDI is a molar ratio of 3.8:0.2:0.75:6.63. The amount of catalyst DBTDL relative to the reaction component is about 0.01.

Radiation curable prepolymer is prepared by reacting TBAM with the obtained isocayanate-capped poly(urethane) according to the procedure described in Example 2.

Lenses are prepared according to the procedure described in Example 2.

EXAMPLE 5

Isocyanate-capped poly(urethane) is prepared according to the precedure described in Example 2. The stoichiometry of PEG-1000, pluronic 17R2, TMP, and IPDI is a molar ratio of 3.8:0.2:0.75:6.64. The amount of catalyst DBTDL relative to the reaction component is about 0.0050.

Radiation curable prepolymer is prepared by reacting HEMA with the obtained isocayanate-capped poly(urethane) according to a procedure similar to that described in Example 2 and in the presence of catalyst.

Lenses are prepared according to the procedure described in Example 2.

EXAMPLE 6

Isocyanate-capped poly(urethane) is prepared according to the precedure described in Example 2. The stoichiometry of PEG-1000, pluronic 17R2, TMP, and IPDI is a molar ratio of 3.8:0.2:0.75:6.64. The amount of catalyst DBTDL relative to the reaction component is about 0.0050.

Radiation curable prepolymer is prepared by reacting HEA with the obtained isocayanate-capped poly(urethane) according to a procedure similar to that described in Example 2 and in the presence of catalyst.

Lenses are prepared according to the procedure described in Example 2.

EXAMPLE 7

Isocyanate-capped poly(urethane) is prepared according to the precedure described in Example 2. The stoichiometry of PEG-1000, pluronic 17R2,.TMP, and IPDI is a molar ratio of 3.8:0.2:1.0:7.0. The amount of catalyst DBTDL relative to the reaction component is about 0.0038.

Radiation curable prepolymer is prepared by reacting HEMA with the obtained isocayanate-capped poly(urethane) according to a procedure similar to that described in Example 2 and in the presence of catalyst.

Lenses are prepared according to the procedure described in Example 2.

EXAMPLE 8

Isocyanate-capped poly(urethane) is prepared according to the precedure described in Example 2. The stoichiometry of PEG-1000, pluronic 17R2, TMP, and IPDI is a molar ratio of 3.8:0.2:1.0:7.0. The amount of catalyst DBTDL relative to the reaction component is about 0.0038.

Radiation curable prepolymer is prepared by reacting HEA with the obtained isocayanate-capped poly(urethane) according to a procedure similar to that described in Example 2 and in the presence of catalyst.

Lenses are prepared according to the procedure described in Example 2.

EXAMPLE 9

Isocyanate-capped poly(urethane) is prepared according to the precedure described in Example 2. The stoichiometry of PEG-1000, pol(THF)-650, Pluronic 17R2, TMP, and IPDI is a molar ratio of 3.8:0.25:0.25:1.0:7.0. The amount of catalyst DBTDL relative to the reaction component is about 0.0050.

Radiation curable prepolymer is prepared by reacting HEMA with the obtained isocayanate-capped poly(urethane) according to a procedure similar to that described in Example 2 and in the presence of catalyst.

Lenses are prepared according to the procedure described in Example 2.

EXAMPLE 10

Isocyanate-capped poly(urethane) is prepared according to the precedure described in Example 2. The stoichiometry of PEG-1000, pol(THF)-650, Pluronic 17R2, TMP, and IPDI is a molar ratio of 3.8:0.25:0.25:1.0:7.0. The amount of catalyst DBTDL relative to the reaction component is about 0.0050.

Radiation curable prepolymer is prepared by reacting HEA with the obtained isocayanate-capped poly(urethane) according to a procedure similar to that described in Example 2 and in the presence of catalyst.

Lenses are prepared according to the procedure described in Example 2.

EXAMPLE 11

Isocyanate-capped poly(urethane) is prepared according to the precedure described in Example 2. The stoichiometry of PEG-1000, Pluronic 17R2, ethylene glycol, TMP, and IPDI is a molar ratio of 3.8:0.25:0.5:0.5:7.0. The amount of catalyst DBTDL relative to the reaction component is about 0.0109.

Radiation curable prepolymer is prepared by reacting HEMA with the obtained isocayanate-capped poly(urethane) according to a procedure similar to that described in Example 2 and in the presence of catalyst.

Lenses are prepared according to the procedure described in Example 2.

EXAMPLE 12

Isocyanate-capped poly(urethane) is prepared according to the precedure described in Example 2. The stoichiometry of PEG-1000, Pluronic 17R2, ethylene glycol, TMP, and IPDI is a molar ratio of 3.8:0.2:0.28:0.75:7.0. The amount of catalyst DBTDL relative to the reaction component is about 0.0046.

Radiation curable prepolymer is prepared by reacting HEMA with the obtained isocayanate-capped poly(urethane) according to a procedure similar to that described in Example 2 and in the presence of catalyst.

Lenses are prepared according to the procedure described in Example 2.

EXAMPLE 13

Isocyanate-capped poly(urethane) is prepared according to the precedure described in Example 2. The stoichiometry of PEG-1000, Pluronic 17R2, poly(THF)-650, TMP, and IPDI is a molar ratio of 3.25:0.25:0.50:1.0:7.0. The amount of catalyst DBTDL relative to the reaction component is about 0.0057.

Radiation curable prepolymer is prepared by reacting HEMA with the obtained isocayanate-capped poly(urethane) according to a procedure similar to that described in Example 2 and in the presence of catalyst.

Lenses are prepared according to the procedure described in Example 2.

EXAMPLE 14

Isocyanate-capped poly(urethane) is prepared according to the precedure described in Example 2. The stoichiometry of Pluronic 17R2, TMP, and IPDI is a molar ratio of 4.0:0.75:6.63. The amount of catalyst DBTDL relative to the reaction component is about 0.010.

Radiation curable prepolymer is prepared by reacting HEMA with the obtained isocayanate-capped poly(urethane) according to a procedure similar to that described in Example 2 and in the presence of catalyst.

Lenses are prepared according to the procedure described in Example 2.

EXAMPLE 15

Preparation of Isocyanate-capped Poly(urethane)

80 grams of activated molecular seives (3 angstrom) is added into a 60° C. melt consisting of PEG-1000 (701.20 grams), Pluronic 17R2 (78.46 grams) and TMP (24.77 grams). The melt is allowed to dry over the sieves for about 20 hours at 60° C. IPDI (287.16 grams) is added into the 60° C. melt and the mixture is maintained at 60° C. After about 1 hour, the mixture is decanted away from the seives and transferred to a 3-neck flask equipped with a paddle stirrer and nitrogen inlet and outlet valves. The mixture is stirred at 75° C. under nitrogen until the percentage on NCO in the prepolymer is about 2.0% by weight. The total reaction time for this is about 98 hours.

Preparation of Radiation-curable Prepolymer

The above NCO terminated poly(urethane) is converted to TBAM capped poly(urethane) in approximately 200 gram portions in 1-liter plastic beakers. To each sample of the NCO terminated poly(urethane) is added a calculated 1-equivalent of TBAM. Samples are mixed thoroughly using plastic rods and then checked by FT-IR. Additional TBAM is added dropwise until NCO is consumed. Aqueous solutions containing about 30 weight percent poly(urethane) are prepared by diluting TBAM capped poly(urethane) samples with de-ionized water containing 0.0714 weight percent Irgacure 2959. Quantities of materials are given below.

| Portion # | Grams of NCO-terminated Poly(urethan) | Grams of TBAM added | Grams of Water containing 0.0714 percent Irgacure 2959 |
| --- | --- | --- | --- |
| 1 | 203.78 | 18.09 | 485.12 |
| 2 | 203.85 | 18.02 | 485.30 |

-continued

| Portion # | Grams of NCO-terminated Poly(urethan) | Grams of TBAM added | Grams of Water containing 0.0714 percent Irgacure 2959 |
|---|---|---|---|
| 3 | 210.70 | 18.70 | 501.54 |
| 4 | 200.39 | 17.78 | 477.06 |

Poly(urethane) water solutions (portions 1-4) are combined and mixed thoroughly. The aqueous poly(urethane) solution had a viscosity of 2670 centipoise. The aqueous poly(urethane) samples are then frozen and then allowed to thawed two days prior to lens making. The poly(urethane) sample is centrifuged at 5000 RPM for 30 minutes and lenses are made in quartz molds under Light Stream manufacturing conditions. The total cure time is 8 seconds.

EXAMPLE 16

Preparation of Isocyanate-capped Poly(urethane)

To a 60° C. melt consisting of PEG-1000 (80.12 grams), Pluronic 17R2 (18.93 grams) and TMP (2.99 grams) is added activated molecular seives (10 grams). The melt is allowed to dry over the sieves for about 20 hours at 60° C. IPDI ( 34.71 grams) is added to the melt and the resulting mixture is heated at 75° C. After about 2 hours the mixture is decanted away from the sieves and transferred to a 3-neck flask equipped with a paddle stirrer and nitrogen inlet and outlet valves. The mixture is stirred at 75° C. under nitrogen until the percentage on NCO in the prepolymer is about 2.0% by weight. The total reaction time for this is about 76 hours.

Preparation of Radiation-curable Prepolymer

To 14.52 grams of NCO terminated poly(urethane) is added 1.50 grams of TBAM. The resulting mixture is stirred and then checked by FT-IR until NCO is consumed.

Lens Preparation

To 16.03 grams of the TBAM capped poly(urethane) is mixed with 37.44 grams of water solution containing 0.043 weight percent Irgacure 2959. The resulting mixture is centrifuged for 10 minutes at 4000 RPM.

Poly(propylene molds are filled with about 75 microliters of poly(urethane) solution. The poly(urethane) samples are then cured for 15 seconds at 2.4 mW/cm². Molds are opened and lenses are placed in borate buffered saline. Lenses are autoclaved and then characterized to determine physical/mechanical properties according to procedures described in Example 1.

EXAMPLE 17

Preparation of Isocyanate-capped Poly(urethane)

To a 60° C. melt consisting of PEG-1000 (62.94 grams), Pluronic 17R2 (14.88 grams) and TMP (1.76 grams) is added activated molecular seives (10 grams). The melt is allowed to dry over the seives for about 20 hours at 60° C. IPDI ( 25.85 grams) is added to the melt and the resulting mixture is heated at 75° C. After about 2 hours the mixture is decanted away from the sieves and transferred to a 3-neck flask equipped with a paddle stirrer and nitrogen inlet and outlet valves. The mixture is stirred at 75° C. under nitrogen until the percentage on NCO in the prepolymer is about 1.6% by weight. The total reaction time for this is about 77 hours.

Preparation of Radiation-curable Prepolymer

To 14.73 grams of NCO terminated poly(urethane) is added 1.31 grams of TBAM. The resulting mixture is stirred and then checked by FT-IR until NCO is consumed.

Lens Preparation

To 16.04 grams of the TBAM capped poly(urethane) is mixed with 37.43 grams of water solution containing 0.043 weight percent Irgacure 2959. The resulting mixture is centrifuged for 10 minutes at 4000 RPM.

Poly(propylene molds are filled with about 75 microliters of poly(urethane) solution. The poly(urethane) samples are then cured for 15 seconds at 2.4 mW/cm². Molds are opened and lenses are placed in borate buffered saline. Lenses are autoclaved and then characterized to determine physical/mechanical properties according to procedures described in Example 1.

EXAMPLE 18

Preparation of Isocyanate-capped Poly(urethane)

To a 60° C. melt consisting of PEG-1000 (61.19 grams), Pluronic L43 (11.66 grams) and TMP (1.72 grams) is added activated molecular seives (9 grams). The melt is allowed to dry over the seives for about 20 hours at 60° C. IPDI (25.21 grams) is added to the melt and the resulting mixture is heated at 75° C. After about 2 hours the mixture is decanted away from the seives and transferred to a 3-neck flask equipped with a paddle stirrer and nitrogen inlet and outlet valves. The mixture is stirred at 75° C. under nitrogen until the percentage on NCO in the prepolymer is about 2.0% by weight. The total reaction time for this is about 132 hours.

Preparation of Radiation-curable Prepolymer

To 15.14 grams of NCO terminated poly(urethane) is added 1.38 grams of TBAM. The resulting mixture is stirred and then checked by FT-IR until NCO is consumed.

Lens Preparation

To 8.40 grams of the TBAM capped poly(urethane) is mixed with 19.60 grams of water solution containing 0.044 weight percent of Irgacure 2959.

Poly(propylene molds are filled with about 75 microliters of poly(urethane) solution. The poly(urethane) samples are then cured for 15 seconds at 2.2 mW/cm2. Molds are opened and lenses are placed in borate buffered saline. Lenses are autoclaved and then characterized to determine physical/mechanical properties according to procedures described in Example 1.

EXAMPLE 19

Preparation of Isocyanate-capped Poly(urethane)

To a 60° C. melt consisting of PEG-1000 (61.19 grams), Pluronic L43 (11.66 grams) and TMP (1.72 grams) is added activated molecular seives (9 grams). The melt is allowed to dry over the seives for about 20 hours at 60° C. IPDI (25.21 grams) is added to the melt and the resulting mixture is heated at 75° C. After about 2 hours the mixture is decanted away from the seives and transferred to a 3-neck flask equipped with a paddle stirrer and nitrogen inlet and outlet valves. The mixture is stirred at 75° C. under nitrogen until the percentage on NCO in the prepolymer is about 2.0% by weight. The total reaction time for this is about 132 hours.

Preparation of Radiation-curable Prepolymer

To 15.14 grams of NCO terminated poly(urethane) is added 1.38 grams of TBAM. The resulting mixture is stirred and then checked by FT-IR until NCO is consumed.

Lens Preparation

To 8.12 grams of the TBAM capped poly(urethane) is mixed with 12.25 grams of water solution containing 0.044 weight percent of Irgacure 2959.

Poly(propylene) molds are filled with about 75 microliters of poly(urethane) solution. The poly(urethane) samples are then cured for 15 seconds at 2.2 mW/cm2. Molds are opened and lenses are placed in borate buffered saline. Lenses are autoclaved and then characterized to determine physical/mechanical properties according to procedures described in Example 1.

EXAMPLE 20

Preparation of Isocyanate-capped Poly(urethane)

To a 60° C. melt consisting of PEG-1000 (82.58 grams), Poly(THF)-650 (3.83 grams), Pluronic 17R2 (12.54 grams) and TMP (2.372 grams) is added activated molecular seives (10 grams). The melt is allowed to dry over the seives for about 20 hours at 60° C. IPDI (34.72 grams) is added to the melt and the resulting mixture is heated at 75° C. After about 2 hours the mixture is decanted away from the sieves and transferred to a 3-neck flask equipped with a paddle stirrer and nitrogen inlet and outlet valves. The mixture is stirred at 75° C. under nitrogen until the percentage on NCO in the prepolymer is about 2.0% by weight. The total reaction time for this is about 82 hours.

Preparation of Radiation-curable Prepolymer

To 14.85 grams of NCO terminated poly(urethane) is added 1.42 grams of TBAM. The resulting mixture is stirred and then checked by FT-IR until NCO is consumed.

Lens Preparation

To 16.27 grams of the TBAM capped poly(urethane) is mixed with 36.03 grams of water solution containing 0.043 weight percent Irgacure 2959.

Poly(propylene) molds are filled with about 75 microliters of poly(urethane) solution. The poly(urethane) samples are then cured for 15 seconds at 2.2 mW/cm2. Molds are opened and lenses are placed in borate buffered saline. Lenses are autoclaved and then characterized to determine physical/mechanical properties according to procedures described in Example 1.

EXAMPLE 21

Preparation of Isocyanate-capped Poly(urethane)

To a 60° C. melt consisting of PEG-1000 (81.04 grams), Poly(THF)-650 (3.52 grams), and TMP (2.176 grams) is added activated molecular seives (10 grams). The melt is allowed to dry over the seives for about 20 hours at 60° C. IPDI ( 31.84 grams) is added to the melt and the resulting mixture is heated at 75° C. After about 2 hours the mixture is decanted away from the sieves and transferred to a 3-neck flask equipped with a paddle stirrer and nitrogen inlet and outlet valves. The mixture is stirred at 75° C. under nitrogen until the percentage on NCO in the prepolymer is about 2.0% by weight. The total reaction time for this is about 132 hours.

Preparation of Radiation-curable Prepolymer

To 14.07 grams of NCO terminated poly(urethane) is added 1.39 grams of TBAM. The resulting mixture is stirred and then checked by FT-IR until NCO is consumed.

Lens Preparation

To 15.46 grams of the TBAM capped poly(urethane) is mixed with 36.03 grams of water solution containing 0.043 weight percent Irgacure 2959.

Poly(propylene) molds are filled with about 75 microliters of poly(urethane) solution. The poly(urethane) samples are then cured for 15 seconds at 2.2 mW/cm2. Molds are opened and lenses are placed in borate buffered saline. Lenses are autoclaved and then characterized to determine physical/mechanical properties according to procedures described in Example 1.

EXAMPLE 22

Preparation of Isocyanate-capped Poly(urethane)

To a 60° C. melt consisting of PEG-1000 (81.30 grams), Poly(THF)-650 (8.14 grams), Pluronic 17R2 (13.31 grams) and TMP (2.52 grams) is added activated molecular seives (10 grams). The melt is allowed to dry over the seives for about 20 hours at 60° C. IPDI (31.84 grams) is added to the melt the resulting mixture is heated at 75° C. in a 3-neck flask equipped with a paddle stirrer and nitrogen inlet and outlet valves. The mixture is stirred at 75° C. under nitrogen until the percentage on NCO in the prepolymer is about 2.0% by weight. The total reaction time for this is about 108 hours.

Preparation of Radiation-curable Prepolymer

To 14.98 grams of NCO terminated poly(urethane) is added 1.57 grams of TBAM. The resulting mixture is stirred and then checked by FT-IR until NCO is consumed.

Lens Preparation

To 16.55 grams of the TBAM capped poly(urethane) is mixed with 38.61 grams of water solution containing 0.043 weight percent Irgacure 2959.

Poly(propylene) molds are filled with about 75 microliters of poly(urethane) solution. The poly(urethane) samples are then cured for 15 seconds at 2.4 mW/cm2. Molds are opened and lenses are placed in borate buffered saline. Lenses are autoclaved and then characterized to determine physical/mechanical properties according to procedures described in Example 1.

EXAMPLE 23

Preparation of Isocyanate-capped Poly(urethane)

To a 60° C. melt consisting of PEG-1000 (81.13 grams), Pluronic 17R2 (9.76 grams) and TMP (2.29 grams) and 3,3-dimethyl-1,2-butanediol (0.68 grams) is added activated molecular seives (10 grams). The melt is allowed to dry over the seives for about 20 hours at 60° C. IPDI (33.69 grams) is added to the melt the resulting mixture is heated at 75° C. for about 1 hour before decanting away from the sieves. The reaction mixture is transferred to a a 3-neck flask equipped with a paddle stirrer and nitrogen inlet and outlet valves. The mixture is stirred at 75° C. under nitrogen until the percentage on NCO in the prepolymer is about 1.70% by weight. The total reaction time for this is about 97 hours.

Preparation of Radiation-curable Prepolymer

To 16.17 grams of NCO terminated poly(urethane) is added 1.48 grams of TBAM. The resulting mixture is stirred and then checked by FT-IR until NCO is consumed.

Lens Preparation

To 17.65 grams of the TBAM capped poly(urethane) is mixed with 41.24 grams of water solution containing 0.043 weight percent Irgacure 2959.

Poly(propylene molds are filled with about 75 microliters of poly(urethane) solution. The poly(urethane) samples are then cured for 15 seconds at 2.4 mW/cm$^2$. Molds are opened and lenses are placed in borate buffered saline. Lenses are autoclaved and then characterized to determine physical/mechanical properties according to procedures described in Example 1.

EXAMPLE 24

Isocyanate-capped poly(urethane) is prepared according to the precedure described in Example 16. The stoichiometry of PEG-1000, pluronic 17R2, TMP, and IPDI is a molar ratio of 3.8:0.2:1.0:7.0.

Radiation curable prepolymer is prepared by reacting TBAM with the obtained isocayanate-capped poly(urethane) according to a procedure similar to that described in Example 16.

Lenses are prepared according to the procedure described in Example 16.

EXAMPLE 25

Isocyanate-capped poly(urethane) is prepared according to the precedure described in Example 16. The stoichiometry of PEG-900, pluronic 17R2, TMP, and IPDI is a molar ratio of 3.8:0.2:0.75:6.63.

Radiation curable prepolymer is prepared by reacting TBAM with the obtained isocayanate-capped poly(urethane) according to a procedure similar to that described in Example 16.

Lenses are prepared according to the procedure described in Example 16.

EXAMPLE 26

Preparation of Isocyanate-capped Poly(urethane)

To a 65° C. melt consisting of PEG-1000 (45.38 grams), PEG-300 (3.41 grams) and TMP (1.52 grams) is added IPDI (20.31 grams). The mixture is stirred at 75° C. under nitrogen until the percentage on NCO in the prepolymer is about 2.0% by weight. The total reaction time for this is about 49 hours.

Preparation of Radiation-curable Prepolymer

To 4.65 grams of prewarmed (65° C.) NCO terminated poly(urethane) is added 0.43 grams of TBAM. The resulting mixture is stirred and then checked by FT-IR until NCO is consumed.

Lens Preparation

To 5.09 grams of the TBAM capped poly(urethane) is mixed with 11.91 grams of water and 0.0090 grams of Irgacure 2959.

Poly(propylene) molds are filled with about 75 microliters of poly(urethane) solution. The poly(urethane) samples are then cured for 10 seconds at 2.5 mW/cm$^2$. Molds are opened and lenses are placed in borate buffered saline. Lenses are autoclaved and then characterized to determine physical/mechanical properties according to procedures described in Example 1.

EXAMPLE 27

Preparation of Isocyanate-capped Poly(urethane)

To a 65° C. melt consisting of PEG-1000 (51.99 grams), and TMP (1.40 grams) is added IPDI (18.54 grams). The mixture is stirred at 75° C. under nitrogen until the percentage on NCO in the prepolymer is about 1.8% by weight. The total reaction time for this is about 46 hours.

Preparation of Radiation-curable Prepolymer

To 5.03 grams NCO terminated poly(urethane) is added 0.41 grams of TBAM. The resulting mixture is stirred and then checked by FT-IR until NCO is consumed.

Lens Preparation

To 5.46 grams of the TBAM capped poly(urethane) is mixed with 12.77. grams of water and 0.0090 grams of Irgacure 2959.

Poly(propylene molds are filled with about 75 microliters of poly(urethane) solution. The poly(urethane) samples are then cured for 10 seconds at 2.5 mW/cm$^2$. Molds are opened and lenses are placed in borate buffered saline. Lenses are autoclaved and then characterized to determine physical/mechanical properties according to procedures described in Example 1.

EXAMPLE 28

Preparation of Isocyanate-capped Poly(urethane)

To a 65° C. melt consisting of PEG-1000 (45.42 grams), PEG-300 (9.06 grams) and TMP (2.02 grams) is added IPDI (26.88 grams). The mixture is stirred at 75° C. under nitrogen until the percentage on NCO in the prepolymer is about 2.37% by weight. The total reaction time for this is about 43 hours.

Preparation of Radiation-curable Prepolymer

To 5.89 grams NCO terminated poly(urethane) is added 0.62 grams of TBAM. The resulting mixture is stirred and then checked by FT-IR until NCO is consumed.

Lens Preparation

To 6.50 grams of the TBAM capped poly(urethane) is mixed with 15.23 grams of water and 0.0108 grams of Irgacure 2959.

Poly(propylene molds are filled with about 75 microliters of poly(urethane) solution. The poly(urethane) samples are then cured for 10 seconds at 2.5 mW/cm$^2$. Molds are opened and lenses are placed in borate buffered saline. Lenses are autoclaved and then characterized to determine physical/mechanical properties according to procedures described in Example 1.

EXAMPLE 29

Preparation of Isocyanate-capped Poly(urethane)

PEG-1450 (40.00 grams), PEEO (2.53 grams) and IPDI (14.34 grams) are combined and heated and stirred at 75° C. under nitrogen until the percentage on NCO in the prepolymer is about 2.42% by weight. The total reaction time for this is about 72 hours.

Preparation of Radiation-curable Prepolymer

To 4.96 grams of prewarmed (65° C.) NCO terminated poly(urethane) is added 0.61 grams of TBAM. The resulting mixture is stirred and then checked by FT-IR until NCO is consumed.

Lens Preparation

To 5.57 grams of the TBAM capped poly(urethane) is added 13.01 grams of water and 0.0093 grams of Irgacure 2959.

Poly(propylene) molds are filled with about 75 microliters of poly(urethane) solution. The poly(urethane) samples are then cured for 10 seconds at 2.5 mW/cm$^2$. Molds are opened and lenses are placed in borate buffered saline. Lenses are autoclaved and then characterized to determine physical/mechanical properties according to procedures described in Example 1.

EXAMPLE 30

Preparation of Isocyanate-capped Poly(urethane)

PEG-1000 (861.30 grams) and TMP (21.67 grams) are combined and heated at 75° C. The resulting melt is dried over 85 grams of 3 angstrom molecular sieves for about 24 hours at 60° C. IPDI (316.90 grams) is mixed with to the PEG/TMP melt and the resulting mixture is heated at 60° C. for about one hour. The reaction mixture is then decanted away from the melt and stirred at 75° C. under nitrogen until the percentage on NCO in the prepolymer is about 2.12% by weight. The total reaction time for this is about 159 hours.

Preparation of Radiation-curable Prepolymer

The above NCO terminated poly(urethane) is converted to TBAM capped poly(urethane) in approximately 200 gram portions in 1-liter plastic beakers. To each sample of poly(urethane) is added a calculated 1-equivalent of TBAM. Samples are mixed thoroughly and then checked by FT-IR. Additional TBAM is added dropwise until NCO is consumed. Aqueous solutions containing about 30 weight percent poly(urethane) are prepared by diluting TBAM capped poly(urethane) samples with de-ionized water containing 0.0714 weight percent Irgacure 2959. Quantities of materials are given below.

| Portion # | Grams of NCO-terminated Poly(urethan) | Grams of TBAM added | Grams of Water containing 0.0714 percent Irgacure 2959 |
| --- | --- | --- | --- |
| 1 | 208.22 | 19.47 | 531.23 |
| 2 | 197.48 | 18.47 | 503.87 |
| 3 | 206.53 | 19.31 | 527.08 |
| 4 | 208.54 | 19.50 | 532.28 |

Lens Preparation and Testing

Contact lenses are prepared using standard Light Stream conditions with the following exceptions: Cure time is 8 seconds total and lenses are placed in phosphate buffered saline after removal from molds. Lenses are autoclaved and then characterized to determine physical/mechanical properties according to procedures described in Example 1.

EXAMPLE 31

Isocyanate-capped poly(urethane) is prepared according to the precedure described in Example 26. The stoichiometry of PEG-1000, PEG-300, TMP, and IPDI is a molar ratio of 4:1:1:8.

Radiation curable prepolymer is prepared by reacting TBAM with the obtained isocayanate-capped poly(urethane) according to a procedure similar to that described in Example 26.

Lenses are prepared according to the procedure described in Example 26.

EXAMPLE 32

Isocyanate-capped poly(urethane) is prepared according to the precedure described in Example 27. The stoichiometry of PEG-1000, TMP, and IPDI is a molar ratio of 5:1:8.

Radiation curable prepolymer is prepared by reacting TBAM with the obtained isocayanate-capped poly(urethane) according to a procedure similar to that described in Example 27.

Lenses are prepared according to the procedure described in Example 27.

EXAMPLE 33

Isocyanate-capped poly(urethane) is prepared according to the precedure described in Example 26. The stoichiometry of PEG-1000, PEG-300, TMP, and IPDI is a molar ratio of 3:2:1:8.

Radiation curable prepolymer is prepared by reacting TBAM with the obtained isocayanate-capped poly(urethane) according to a procedure similar to that described in Example 26.

Lenses are prepared according to the procedure described in Example 26.

EXAMPLE 34

Preparation of Isocyanate-capped Poly(urethane)

PEG-1450 (40.00 grams), PEEO (2.53 grams) and IPDI (14.34 grams) are combined and heated and stirred at 75° C. under nitrogen until the percentage on NCO in the prepolymer is about 2.42% by weight. The total reaction time for this is about 72 hours.

Preparation of Radiation-curable Prepolymer

To 4.96 grams of prewarmed (65° C.) NCO terminated poly(urethane) is added 0.61 grams of TBAM. The resulting mixture is stirred and then checked by FT-IR until NCO is consumed.

Lens Preparation

To 5.57 grams of the TBAM capped poly(urethane) is added 13.01 grams of water and 0.0093 grams of Irgacure 2959.

Poly(propylene) molds are filled with about 75 microliters of poly(urethane) solution. The poly(urethane) samples are then cured for 10 seconds at 2.5 mW/cm$^2$. Molds are opened and lenses are placed in borate buffered saline. Lenses are autoclaved and then characterized to determine physical/mechanical properties according to procedures described in Example 1.

EXAMPLE 35

Isocyanate-capped poly(urethane) is prepared according to the precedure described in Example 34. The stoichiometry of PEG-1450, TMP, and IPDI is a molar ratio of 3:1:6.

Radiation curable prepolymer is prepared by reacting TBAM with the obtained isocayanate-capped poly(urethane) according to a procedure similar to that described in Example 34.

Lenses are prepared according to the procedure described in Example 34.

EXAMPLE 36

Tables 1 and 2 summarize the properties of lenses prepared from radiation-curable prepolymers which are obtained by reacting a NCO-capped poly(urethane) with an ethylenically unsaturated group-capping agent (amine or hydroxy compound).

TABLE 1A

| Example No. | Polyalkylene glycol(s) | Branching agent | di-isocyanate | Catalyst DBTDL | Ethylenical Unsaturated Group Capping Agent |
| --- | --- | --- | --- | --- | --- |
| Example 2 1525-65 | 3.8 PEG-1000 0.2 Pluronic 17R2 | 1 TMP | 7 IPDI | 0.045 | TBAM (1525-69) |
| Example 3 1525-66 | 3.8 PEG-1000 0.2 Pluronic 17R2 | 0.75 | 6.63 | 0.045 | TBAM (1525-71) |
| Example 4 1525-73 | 3.8 PEG-1000 0.2 Pluronic 17R2 | 0.75 | 6.63 | 0.010 | TBAM (1525-75 |
| Example 5 1532-13 See note 3 | 3.8 PEG-1000 0.2 Pluronic 17R2 | 0.75 | 6.64 | 0.0050 | HEMA (1532-15) |
| Example 6 1532-13 | 3.8 PEG-1000 0.2 Pluronic 17R2 | 0.75 | 6.64 | 0.0050 | HEA (1532-36) |
| Example 7 1532-18 | 3.8 PEG-1000 0.2 Pluronic 17R2 | 1.0 | 7 | 0.0038 | HEMA (1532-26) |
| Example 8 1532-18 | 3.8 PEG-1000 0.2 Pluronic 17R2 | 1.0 | 7 | 0.0038 | HEA (1532-35) |
| Example 9 1532-19 | 3.8 PEG-1000 0.25 Poly(THF-650) 0.25 Pluronic 17R2 | 1 | 7 | 0.0050 | HEMA (1532-28) |
| Example 10 1532-19 | 3.8 PEG-1000 0.25 Poly(THF-650) 0.25 Pluronic 17R2 | 1 | 7 | 0.0050 | HEA (1532-34) |
| Example 11 1532-54-AQ non-autoclaved | 3.8 PEG-1000 0.2 Pluronic 17R2 0.5 ethylene glycol | 0.5 | 7 | 0.0109 | HEMA (1532-54) |
| Example 12 1532-53-AQ | 3.8 PEG-1000 0.2 Pluronic 17R2 0.28 ethylene glycol | 0.75 | 7 | 0.0046 | HEMA (1532-53) |
| Example 13 1532-58-AQ | 3.25 PEG-1000 0.25 Pluronic 17R2 0.50 Poly(THF)-650 | 1 | 7 | 0.0057 | HEMA (1532-58) |
| Example 14 1532-60-AQ | 4 Pluronic 17R2 | 0.75 | 6.63 | 0.010 | HEMA (1532-59) |

1) TBAM = 2-tert-butylaminoethylmethacrylate, HEMA = 2-hydroxyethylacrylate, HEA = 2-hydroxyethylacrylate
2) Catalyst amount refers to the relative quantity used during the preparation of NCO capped poly(urethane) prepolymers. Additional catalyst is often used during capping reactions of NCO terminated poly(urethanes) with HEMA and or HEA.

TABLE 1B

| Example | Viscosity[1] | Curing Time (sec) | Curing Intensity (mW/cm$^2$) | SatB[2] (N/mm$^2$) | EatB[2] (%) | Modulus (N/mm$^2$) | H$_2$O (%) | Pin hole test |
|---|---|---|---|---|---|---|---|---|
| Example 2 1525-65 | 3710 | 10 | 2.2 | 1.47 | 809 | 0.44 | 67 | pass |
| Example 3 1525-66 | 2200 | 10 | 2.2 | 1.01 | 854 | 0.28 | 67 | pass |
| Example 4 1525-73 | 2200 | 10 | 2.2 | 1.80 | 1290 | 0.34 | 70.0 | pass |
| Example 5 1532-13 | 444 | 10 | 2.2 | 1.43[3] | 366[3] | 0.44[3] | 72[3] | Fail[3] |
| [1532-16] | | 10 | 2.2 | 0.98[4] | 283[4] | 0.36[4] | 73[4] | Fail[4] |
| Example 5 1532-13 | 444 | 8 | 2.2 | N/A | N/A | N/A | 69[5a] | Fail[5a] |
| [1532-16] | | 6 | 2.2 | N/A | N/A | N/A | 68[5b] | Fail[5b] |
| | | 4 | 2.2 | N/A | N/A | N/A | 68[5c] | Pass[5c] |
| Example 6 1532-13 | 615 | 4 | 2.2 | 1.1[6a] | 443[6a] | 0.34[6a] | 71[6a] | Pass[6a] |
| [1532-42] | | 4 | 2.2 | 1.0[6b] | 389[6b] | 0.33[6b] | 73[6b] | Pass[6b] |
| Example 7 1532-18 | 391 | 4 | 2.2 | 2.2[6a] | 516[6a] | 0.54[6a] | 68[6a] | Pass[6a] |
| [1532-31] | | 4 | 2.2 | 2.0[6b] | 445[6b] | 0.59[6b] | 69[6b] | Pass[6b] |
| Example 8 1532-18 | 291 | 4 | 2.2 | 1.1[6a] | 344[6a] | 0.38[6a] | 72[6a] | Pass[6a] |
| [1532-41] | | 4 | 2.2 | 0.74[6b] | 220[6b] | 0.35[6b] | 74[6b] | Pass[6b] |
| | | 4 | 2.2 | NA[6c] | NA[6c] | NA[6c] | 72[6c] | Pass[6c] |
| Example 9 1532-19 | 1350 | 4 | 2.2 | 1.4[6a] | 480[6a] | 0.42[6a] | 69[6a] | Pass[6a] |
| [1532-33] | | 4 | 2.2 | 1.4[6b] | 448[6b] | 0.43[6b] | 69[6b] | Pass[6b] |
| | | 6 | 2.2 | 0.67[6b] | 379[6b] | 0.22[6b] | 74[6b] | Pass[6b] |
| | | 6 | 2.2 | NA[6c] | NA[6c] | NA[6c] | 73[6c] | Pass[6c] |
| Example 10 1532-19 | 1630 | 6 | 2.2 | 0.63[6a] | 354[6a] | 0.21[6a] | 71[6a] | Fail[6a] |
| [1532-40] | | 5 | 2.2 | 2.2[6c] | 607[6c] | 0.53[6c] | 67[6c] | Pass[6c] |
| | | 5 | 2.2 | 2.2[6b] | 502[6b] | 0.61[6b] | 65[6b] | Pass[6b] |
| Example 11 1532-54-AQ | 1020 (40%) | 5 | 2.2 | 2.2[7a] | 607[7a] | 0.53[7a] | 67[7a] | Pass[7a] |
| [1532-62] | | 5 | 2.2 | 2.2[7b] | 502[7b] | 0.61[7b] | 65[7b] | Pass[7b] |
| Example 12 1532-53-AQ | 2590 | 5 | 2.2 | 3.5[7a] | 660[7a] | 0.57[7a] | 68[7a] | Passed[7a] |
| [1532-62] | | 5 | 2.2 | 2.3[7b] | 545[7b] | 0.57[7b] | 68[7b] | Failed[7b] |
| Example 13 1532-58-AQ | 54000 | | | N/A[8] | | | | |
| Example 14 1532-60-AQ | ~8000 [1532-62] | | | N/A[9] | | | | |

[1]The viscosity of the aqueous prepolymer solution (30% by weight of the prepolymer unless otherwise stated) for making lenses.
[2]SatB = Stress at break; EatB = Elongation at beak.
[3]Autoclaved once prior to testing.
[4]Lenses are autoclaved twice prior to testing.
[5]Lenses are all cured at 2.2 mW/cm$^2$ for 8, 6, or 4 seconds and then autoclaved prior to testing
  [a]8 second cure time
  [b]6 second cure time
  [c]4 second cure time
[6]Lenses are all cured at 2.2 mW/cm$^2$ for 8, 6, or 4 seconds and then autoclaved prior to testing
  [a]4 second cure time, lenses are subjected to one autoclave cycle prior to testing
  [b]4 second cure time, lenses are subjected to two autoclave cycles prior to testing
  [c]4 second cure time, lenses are not autoclaved
[7]Lenses are cured at 2.2 mW/cm$^2$ for 5 seconds
  [a]Non-autoclaved lenses
  [b]Autoclaved lenses
[8]The Solution is very viscous and formed cloudy lenses with 69% water content upon UV-Cure. No other measurements are performed.
[9]Cloud point is near room temperature and no other measurements are made.

TABLE 2A

| Example No. | Polyalkylene glycol(s) | Branching agent | di-isocyanate | Ethylenical unsaturated group capping agent |
|---|---|---|---|---|
| Example 15 1513-63 | 3.8 PEG-1000 0.2 Pluronic 17R2 | 1 TMP | 7 IPDI | TBAM |
| Example 16 1513-89-1 | 3.6 PEG-1000 0.4 Pluronic 17R2 | 1 TMP | 7 TMP | TBAM |
| Example 17 1513-89-2 | 3.6 PEG-1000 0.4 Pluronic 17R2 | 0.75 TMP | 6.64 IPDI | TBAM |
| Example 18 1513-96-1 | 3.6 PEG-1000 0.4 Pluronic L43 | 0.75 TMP | 6.64 IPDI | TBAM |
| Example 19 1513-96-2 | 3.6 PEG-1000 0.4 Pluronic L43 | 0.75 TMP | 6.64 IPDI | TBAM |
| Example 20 | 3.5 PEG-1000 | 0.75 TMP | 6.63 IPDI | TBAM |

TABLE 2A-continued

| Example No. | Polyalkylene glycol(s) | Branching agent | di-isocyanate | Ethylenical unsaturated group capping agent |
|---|---|---|---|---|
| 1525-4 | 0.25 poly(THF)-650 0.25 Pluronic 17R2 | | | |
| Example 21 1525-6 | 3.75 PEG-1000 0.25 poly(THF)-650 | 0.75 TMP | 6.62 IPDI | TBAM |
| Example 22 1525-30 | 3.25 PEG-1000 0.5 poly(THF)-650 0.25 Pluronic 17R2 | 0.75 TMP | 6.63 IPDI | TBAM |
| Example 23 1525-36 | 3.55 PEG-1000 0.25 Pluronic 17R2 0.25 3,3-DM-1,2-BD | 0.75 TMP | 6.63 IPDI | TBAM |
| Example 24 1513-63 | 3.8 PEG-1000 0.2 Pluronic 17R2 | 1 TMP | 7 IPDI | TBAM |
| Example 25 1525-38 | 3.8 PEG-900 0.2 Pluronic 17R2 | 0.75 TMP | 6.63 IPDI | TBAM |
| Example 26 1310-48 | 4 PEG-1000 1 PEG-300 | 1 TMP | 8 IPDI | TBAM |
| Example 27 1310-49 | 5 PEG-1000 | 1 TMP | 8 IPDI | TBAM |
| Example 28 1310-57 | 3 PEG-1000 2 PEG-300 | 1 TMP | 8 IPDI | TBAM |
| Example 29 1310-25 | 3 PEG-1450 1 PEG-300 | 1 PEEO | 7 IPDI | TBAM |
| Example 30 1513-59 | 4 PEG-1000 | 0.75 TMP | 6.62 IPDI | TBAM |
| Example 31 1310-48 | 4 PEG-1000 1 PEG-300 | 1 TMP | 8 IPDI | TBAM |
| Example 32 1310-49 | 5 PEG-1000 | 1 TMP | 8 IPDI | TBAM |
| Example 33 1310-57 | 3 PEG-1000 2 PEG-300 | 1 TMP | 8 IPDI | TBAM |
| Example 34 1310-25 | 3 PEG-1450 | 1 PEEO | 7 IPDI | TBAM |
| Example 35 1302-20-C | 3 PEG-1450 | 1 TMP | 6 IPDI | TBAM |

TABLE 2B

| Example No. | Viscosity | Stress at break (N/mm²) | Elongation at beak (%) | Modulus (N/mm²) | H₂O (%) | Pin hole test |
|---|---|---|---|---|---|---|
| Example 15 1513-63 | 2670 | 0.79 1.2 0.87 | 1002 (>476) 1047 | 0.28 0.12 0.11 | 71 | pass |
| Example 16 1513-89-1 | 1030 | 0.53 | 1221 | 0.06 | 76 | |
| Example 17 1513-89-2 | 1320 | 0.74 | 1404 | 0.09 | 76 | pass |
| Example 18 1513-96-1 | 1060 | 0.67 | 1574 | 0.10 | 75 | pass |
| Example 19 1513-96-2 | 2780 | 0.57 | 1360 | 0.10 | 76 | pass |
| Example 20 1525-4 | 1510 | 0.54 | 1411 | 0.07 | 76 | pass |
| Example 21 1525-6 | 862 | 0.36 | 1419 | 0.03 | 79 | pass |
| Example 22 1525-30 | 3610 | 0.54 | 1419 | 0.11 | 73 | pass |
| Example 23 1525-36 | 1200 | 0.84 | 1725 | 0.04 | 75 | pass |
| Example 24 1513-63 | 2670 | 1.4 | 1283 | 0.18 | 70 | pass |
| Example 25 1525-38 | 1200 | 0.81 | 1229 | 0.11 | 72 | pass |
| Example 26 1310-48 | 1990 | 0.6 | 1512 | 0.08 | 75 | |
| Example 27 1310-49 | 1120 | 0.43 | 1296 | 0.05 | 80 | |
| Example 28 1310-57 | 2450 | 0.58 | 1237 | 0.06 | 73 | |
| Example 29 1310-25 | 71500 | 0.63 | 500 | 0.21 | 77 | |
| Example 30 1513-59 | 1400 | 0.62 | 1213 | 0.15 | 71 | |

TABLE 2B-continued

| Example No. | Viscosity | Stress at break (N/mm²) | Elongation at beak (%) | Modulus (N/mm²) | H₂O (%) | Pin hole test |
|---|---|---|---|---|---|---|
| Example 31 1310-48 | 1990 | 0.6 | 1512 | 0.08 | 75 | |
| Example 32 1310-49 | 1120 | 0.43 | 1296 | 0.05 | 80 | |
| Example 33 1310-57 | 2450 | 0.58 | 1237 | 0.06 | 73 | |
| Example 34 1310-25 | 71500 | 0.63 | 500 | 0.21 | 77 | |
| Example 35 1302-20-C | 2640 | 0.6 | 623 | 0.11 | 79 | |

What is claimed is:

1. A method for producing a radiation-curable prepolymer, comprising the steps of:
(I) preparing a melted reaction mixture which is substantially free of a solvent, the melted reaction mixture comprising the components of (a) one or more polyalkylene glycols, (b) one or more branching agents, and (c) at least one di- or polyisocyanate, wherein the stoichiometry of components (a), (b) and (c) in the melted reaction mixture is chosen so that the number of NCO equivalents of component (c) is greater than the sum of OH equivalents of components (a) and (b);
(II) reacting components (a) and (b) with component (c) in the melted reaction mixture at a desired temperature to form an isocyanate-capping polyurethane; and
(III) reacting the formed isocyanate-capping polyurethane, without intermediate isolation, with a radiation-curable group-capping agent, which is an ethylenically unsaturated monohydroxy compound, to prepare the radiation-curable polyurethane prepolymer,
wherein component (a) consists of at least one poly(ethylene glycol) and at least one hydroxy-terminated poly(ethylene glycol)-poly(propylene glycol)-poly(ethylene glycol) or poly(propylene glycol)-poly(ethylene glycol)-poly(propylene glycol) tri-block copolymers,
wherein component (b) consists of one or more linear or branched aliphatic polyhydroxy compounds of formula (2)

$$R_4-(OH)_x \quad (2)$$

wherein $R_4$ is a linear or branched $C_3$-$C_{18}$ aliphatic multi-valent radical and x is a number from 3 to 8, and
wherein component (c) consists of one or more diisocyanates of formula $$OCN-R_5-NCO \quad (3a),$$

wherein $R_5$ is a linear or branched $C_3$-$C_{18}$-alkylene, an unsubstituted or $C_1$-$C_4$-alkyl-substituted or $C_1$-$C_4$-alkoxy-substituted $C_6$-$C_{10}$-arylene, a $C_7$-$C_{18}$-aralkylene, a $C_6$-$C_{10}$-arylene-$C_1$-$C_2$-alkylene-$C_6$-$C_{10}$-arylene, a $C_3$-$C_8$-cycloalkylene, a $C_3$-$C_8$-cycloalkylene-$C_1$-$C_6$-alkylene, a $C_3$-$C_8$-cycloalkylene-$C_1$-$C_2$-alkylene-$C_3$-$C_8$-cycloalkylene, or a $C_1$-$C_6$-alkylene-$C_3$-$C_8$-cycloalkylene-$C_1$-$C_6$-alkylene,
wherein said ethylenically unsaturated amine is selected from the group consisting of mono-$C_1$-$C_4$ alkylamino-$C_1$-$C_4$ alkyl-acrylates, mono-$C_1$-$C_4$ alkylamino-$C_1$-$C_4$ alkyl-methacrylates, di-$C_1$-$C_4$ alkylamino-$C_1$-$C_4$ alkyl-acrylates and di-$C_1$-$C_4$ alkylamino-$C_1$-$C_4$ alkyl-methacrylates, and wherein said ethylenically unsaturated hydroxy compound is selected from the group consisting of hydroxy-substituted $C_1$-$C_6$ alkylacrylates and hydroxy-substituted $C_1$-$C_6$ alkyl-methacrylates.

2. A method of claim 1, wherein component (b) consists of one or more polyhydroxy compounds selected from the group consisting of glycerol, diglycerol, triglycerol, 1,1,1-trishydroxymethylethane, 1,1,1-trishydroxymethylpropane, 1,2,4-butanetriol, 1,2,6-hexanetriol, erythritol, pentaerythritol, di- and tripentaerythritol, arabitol, sorbitol, disorbitol and mannitol and mixtures thereof, and wherein $R_5$ signifies linear or branched $C_6$-$C_{10}$-alkylene, cyclohexylene-methylene or cyclohexylene-methylene-cyclohexylene either unsubstituted or substituted in the cyclohexyl moiety by 1 to 3 methyl groups, or phenylene or phenylene-methylene-phenylene either unsubstituted or substituted in the phenyl moiety by methyl.

3. An ophthalmic device, wherein the ophthalmic device is obtained by curing, in a mold with an actinic radiation mean, (I) an essentially solvent-free liquid or melt of a radiation-curable prepolymer in the presence of or in the absence of one or more additional vinylic comonomers, or (II) an aqueous solution of said radiation-curable prepolymer in the presence of or in the absence of one or more additional vinylic comonomers, wherein said radiation-curable prepolymer is a reaction product of an ethylenically unsaturated amine or an ethylenically unsaturated monohydroxy compound or a mixture thereof with an isocyanate-capped polyurethane, wherein said isocyanate-capped polyurethane is a copolymerization product of the components of:

(a) at least one poly(ethylene glycol) and at least one hydroxy-terminated poly(ethylene glycol)-poly(propylene glycol)-poly(ethylene glycol) or poly(propylene glycol)-poly(ethylene glycol)-poly(propylene glycol) tri-block copolymers,
(b) at least one branching agent selected from the group consisting of
(i) a linear or branched aliphatic polyhydroxy compound of formula $$R_4-(OH)_x \quad (2),$$

wherein $R_4$ is a linear or branched $C_3$-$C_{18}$ aliphatic multi-valent radical and x is a number ≧3,
(ii) a polyether polyol, which is the polymerization product of a compound of formula (2) and a glycol,
(iii) a polyester polyol, which is the polymerization product of a compound of formula (2), a dicarboxylic acid or a derivative thereof and a diol, and
(iv) a cycloaliphatic polyol selected from the group consisting of a $C_5$-$C_8$-cycloalkane which is substituted by ≧3 hydroxy groups and which is unsubstituted by alkyl radical, a $C_5$-$C_8$-cycloalkane which is substituted by ≧3 hydroxy groups and which is substituted by one ore more $C_1$-$C_4$ alkyl radicals, and an unsubstituted mono- and disaccharide, and
(v) an aralkyl polyol having at least three hydroxy $C_1$-$C_4$ alkyl radicals, and
(c) at least one di- or polyisocyanate of formula

wherein $R_5$ is the radical of an aliphatic, cycloaliphatic, aliphatic-cycloaliphatic, aromatic or araliphatic di- or polyisocyanate and y is a number from 2 to 6, wherein said ethylenically unsaturated monohydroxy compound is a hydroxy-substituted lower alkylacrylate, a hydroxy-substituted lower alkylmethacrylate, a hydroxy-substituted lower alkyl-acrylamides, a hydroxy-substituted lower alkyl-methacrylamide, or a hydroxy-substituted lower alkylvinylether, wherein said ethylenically unsaturated amine has formula (4), (4') or (4")

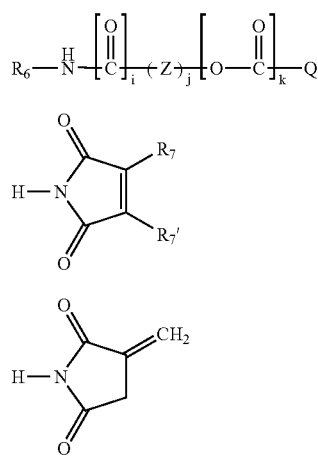

In which, I, j and k, independent of one another, are 0 or 1;

$R_6$ is hydrogen, a linear or branched $C_1$-$C_{24}$ alkyl, a $C_2$-$C_{24}$ alkoxyalkyl, a $C_2$-$C_{24}$ alkylcarbonyl, a $C_2$-$C_{24}$ alkoxycarbonyl, an unsubstituted or $C_1$-$C_4$ alkyl- or $C_1$-$C_4$ alkoxy-substituted $C_6$-$C_{10}$ aryl, a C7-C18 aralkyl, a C13-C22 arylalkylaryl, a C3-C8 cycloalkyl, a $C_4$-$C_{14}$ cycloalkylalkyl, a $C_7$-$C_{18}$ cycloalkylalkylcycloalkyl, a $C_5$-$C_{20}$ alkylcycloalkylalkyl, or an aliphatic-heterocyclic radical;

Z is a $C_1$-$C_{12}$ alkylene radical, phenylene radical or $C_7$-$C_{12}$ aralkylene radical;

$R_7$ and $R_7'$, independently of each other, are hydrogen, $C_1$-$C_4$ alkyl or halogen; and Q is a radical of formula (5)

wherein q is the number 0 or 1, each of $R_8$ and $R_9$ independently of the other is hydrogen, $C_1$-$C_4$ alkyl, phenyl, carboxy or halogen, $R_{10}$ is hydrogen, $C_1$-$C_4$ alkyl or halogen, and Z' is a linear or branched $C_1$-$C_{12}$ alkylene, an unsubstituted phenylene, an $C_1$-$C_4$ alkyl- or $C_1$-$C_4$ alkoxy-substituted phenylene, or a $C_7$-$C_{12}$ aralkylene.

4. An ophthalmic device of claim 3, wherein $R_5$ signifies linear or branched $C_6$-$C_{10}$-alkylene, cyclohexylene-methylene or cyclohexylene-methylene-cyclohexylene either unsubstituted or substituted in the cyclohexyl moiety by 1 to 3 methyl groups, or phenylene or phenylene-methylene-phenylene either unsubstituted or substituted in the phenyl moiety by methyl.

5. An ophthalmic device of claim 4, wherein said ethylenically unsaturated amine is 2-terbutylaminoethylmethacrylate or 2-terbutylaminoethylacrylate, wherein said ethylenically unsaturated hydroxy compound is 2-hydroxyethylmethacrylate or 2-hydroxyethylacrylate, and wherein component (c) consists of a diisocyanate selected from the group consisting isophorone diisocyanate (IPDI), toluylene-2,4-diisocyanate (TDI), methylenebis(cyclohexyl-isocyanate), 1,6-diisocyanato-2,2,4-trimethyl-n-hexane (TMDI), methylenebis(phenylisocyanate) and hexamethylene-diisocyanate (HMDI).

* * * * *